United States Patent
Gassend et al.

(10) Patent No.: US 12,133,005 B2
(45) Date of Patent: *Oct. 29, 2024

(54) SYNCHRONIZED SPINNING LIDAR AND ROLLING SHUTTER CAMERA SYSTEM

(71) Applicant: Waymo LLC, Mountain View, CA (US)

(72) Inventors: Blaise Gassend, East Palo Alto, CA (US); Benjamin Ingram, Santa Clara, CA (US); Andreas Wendel, Mountain View, CA (US); Mark Alexander Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,249

(22) Filed: Jan. 5, 2023

(65) Prior Publication Data

US 2023/0147270 A1  May 11, 2023

Related U.S. Application Data

(63) Continuation of application No. 17/186,121, filed on Feb. 26, 2021, now Pat. No. 11,558,566, which is a
(Continued)

(51) Int. Cl.
*H04N 5/353* (2011.01)
*G01S 17/42* (2006.01)
(Continued)

(52) U.S. Cl.
CPC .......... *H04N 25/531* (2023.01); *G01S 17/42* (2013.01); *G01S 17/86* (2020.01); *G01S 17/89* (2013.01);
(Continued)

(58) Field of Classification Search
CPC .... H04N 5/3532; H04N 5/341; H04N 5/2353; H04N 5/247; H04N 5/2351
See application file for complete search history.

(56) References Cited

U.S. PATENT DOCUMENTS 7,319,777 B2   1/2008   Morcom
7,544,945 B2   6/2009   Tan et al.
(Continued)

FOREIGN PATENT DOCUMENTS

CN   107037443 A   8/2017
EP   2388615 A1   11/2011
(Continued)

OTHER PUBLICATIONS

Search Report and Written Opinion for PCT/US2018/042095 dated Nov. 2, 2018.
(Continued)

*Primary Examiner* — Nam D Pham
(74) *Attorney, Agent, or Firm* — McDonnell Boehnen Hulbert & Berghoff LLP

(57) ABSTRACT

One example system comprises a LIDAR sensor that rotates about an axis to scan an environment of the LIDAR sensor. The system also comprises one or more cameras that detect external light originating from one or more external light sources. The one or more cameras together provide a plurality of rows of sensing elements. The rows of sensing elements are aligned with the axis of rotation of the LIDAR sensor. The system also comprises a controller that operates the one or more cameras to obtain a sequence of image pixel
(Continued)

rows. A first image pixel row in the sequence is indicative of external light detected by a first row of sensing elements during a first exposure time period. A second image pixel row in the sequence is indicative of external light detected by a second row of sensing elements during a second exposure time period.

20 Claims, 7 Drawing Sheets

Related U.S. Application Data continuation of application No. 16/556,683, filed on Aug. 30, 2019, now Pat. No. 10,939,057, which is a continuation of application No. 15/719,366, filed on Sep. 28, 2017, now Pat. No. 10,523,880.

(51) Int. Cl.

| | | |
|---|---|---|
| *G01S 17/86* | (2020.01) | |
| *G01S 17/89* | (2020.01) | |
| *G06T 7/521* | (2017.01) | |
| *G06T 7/90* | (2017.01) | |
| *G06T 17/05* | (2011.01) | |
| *H04N 5/225* | (2006.01) | |
| *H04N 5/232* | (2006.01) | |
| *H04N 5/235* | (2006.01) | |
| *H04N 5/247* | (2006.01) | |
| *H04N 5/341* | (2011.01) | |
| *H04N 23/45* | (2023.01) | |
| *H04N 23/698* | (2023.01) | |
| *H04N 23/71* | (2023.01) | |
| *H04N 23/73* | (2023.01) | |
| *H04N 23/90* | (2023.01) | |
| *H04N 25/40* | (2023.01) | |
| *H04N 25/531* | (2023.01) | |

(52) U.S. Cl.
CPC .......... *G06T 7/521* (2017.01); *H04N 23/45* (2023.01); *H04N 23/698* (2023.01); *H04N 23/71* (2023.01); *H04N 23/73* (2023.01); *H04N 23/90* (2023.01); *H04N 25/40* (2023.01); *G06T 7/90* (2017.01); *G06T 17/05* (2013.01); *G06T 2207/10028* (2013.01); *G06T 2207/10144* (2013.01); *G06T 2207/10152* (2013.01)

(56) References Cited

U.S. PATENT DOCUMENTS

| | | | |
|---|---|---|---|
| 8,965,677 | B2 | 2/2015 | Breed et al. |
| 9,420,203 | B2 | 8/2016 | Broggi et al. |
| 9,618,620 | B2 | 4/2017 | Zweigle et al. |
| 9,625,582 | B2 | 4/2017 | Gruver et al. |
| 10,523,880 | B2 | 12/2019 | Gassend et al. |
| 10,656,275 | B1 * | 5/2020 | Bills .................. G01S 17/87 |
| 10,939,057 | B2 | 3/2021 | Gassend et al. |
| 11,558,566 | B2 | 1/2023 | Gassend et al. |
| 2010/0157280 | A1 | 6/2010 | Kusevic et al. |
| 2013/0226344 | A1 | 8/2013 | Wong et al. |
| 2015/0219764 | A1 | 8/2015 | Lipson |
| 2015/0301328 | A1 * | 10/2015 | Gonzaga .............. G02B 21/365 |
| | | | 348/79 |
| 2016/0047896 | A1 | 2/2016 | Dussan |
| 2016/0103224 | A1 | 4/2016 | Stettner et al. |
| 2016/0282453 | A1 | 9/2016 | Pennecot et al. |
| 2017/0090032 | A1 | 3/2017 | Ridderbusch |
| 2017/0123053 | A1 | 5/2017 | Stigwall et al. |
| 2017/0269209 | A1 | 9/2017 | Hall et al. |
| 2018/0136314 | A1 * | 5/2018 | Taylor .................. G01S 17/931 |
| 2018/0173237 | A1 | 6/2018 | Reiley et al. |
| 2019/0011927 | A1 | 1/2019 | Mou |

FOREIGN PATENT DOCUMENTS

| | | |
|---|---|---|
| FR | 3010221 A1 | 3/2015 |
| JP | 2017-101965 A | 6/2017 |
| KR | 10-2009-0021724 A | 3/2009 |
| WO | 2016047847 A1 | 3/2016 |
| WO | 2018213338 A1 | 11/2018 |

OTHER PUBLICATIONS

S. Gould and D. Muoio, "Here's how Waymo's brand new self-driving cars see the world", Business Insider, http://www.businessinsider.com/how-does-googles-waymo-self-driving-car-work-graphic-2017-1, Jan. 18, 2017.

* cited by examiner

400

ROTATE A LIDAR SENSOR ABOUT AN AXIS TO SCAN AN ENVIRONMENT OF THE LIDAR SENSOR — 402

WHILE ROTATING THE LIDAR SENSOR, OBTAIN A SEQUENCE OF IMAGE PIXELS USING ONE OR MORE CAMERAS THAT DETECT EXTERNAL LIGHT ORIGINATING FROM ONE OR MORE EXTERNAL LIGHT SOURCES — 404

SYNCHRONIZED SPINNING LIDAR AND ROLLING SHUTTER CAMERA SYSTEM

CROSS-REFERENCE TO RELATED APPLICATIONS

This application is a continuation of U.S. patent application Ser. No. 17/186,121, filed Feb. 26, 2021, which is a continuation of U.S. patent application Ser. No. 16/556,683, filed Aug. 30, 2019, which is a continuation of U.S. patent application Ser. No. 15/719,366, filed Sep. 28, 2017. The foregoing applications are incorporated herein by reference.

BACKGROUND

Active sensors, such as light detection and ranging (LIDAR) sensors, radio detection and ranging (RADAR) sensors, and sound navigation and ranging (SONAR) sensors, among others, can scan an environment by emitting signals toward the environment and detecting reflections of the emitted signals. Passive sensors, such as image sensors and microphones among others, can detect signals originating from sources in the environment.

An example LIDAR sensor can determine distances to environmental features while scanning through a scene to assemble a "point cloud" indicative of reflective surfaces. Individual points in the point cloud can be determined, for example, by transmitting a laser pulse and detecting a returning pulse, if any, reflected from an object in the environment, and then determining a distance to the object according to a time delay between the transmission of the pulse and the reception of its reflection. Thus, a three-dimensional map of points indicative of locations of reflective features in the environment can be generated.

An example image sensor can capture an image of a scene viewable to the image sensor. For instance, the image sensor may include an array of complementary metal oxide semiconductor (CMOS) active pixel sensors, or other types of light sensors. Each CMOS sensor may receive a portion of light from the scene incident on the array. Each CMOS sensor may then output a measure of the amount of light incident on the CMOS sensor during an exposure time when the CMOS sensor is exposed to the light from the scene. With this arrangement, an image of the scene can be generated, where each pixel in the image indicates one or more values (e.g., colors, etc.) based on outputs from the array of CMOS sensors.

SUMMARY

In one example, a system includes a light detection and ranging (LIDAR) sensor that includes a transmitter and a receiver. The transmitter emits light pulses toward an environment of the LIDAR sensor. The receiver detects reflections of the emitted light pulses. The LIDAR sensor scans the environment based on rotation of the LIDAR sensor about an axis. The system also includes one or more cameras that detect external light originating from one or more external light sources. The one or more cameras together provide a plurality of rows of sensing elements. Each row of sensing elements is aligned with the axis of rotation of the LIDAR sensor. The system also includes a controller that operates the one or more cameras to obtain a sequence of image pixel rows. A first image pixel row in the sequence is indicative of a measurement of the external light by a first row of sensing elements during a first exposure time period. A second image pixel row in the sequence is indicative of a measurement of the external light by a second row of sensing elements during a second exposure time period.

In another example, a device includes a light detection and ranging (LIDAR) sensor that emits a plurality of light beams, directs the plurality of light beams toward a field-of-view (FOV) defined by a pointing direction of the LIDAR sensor, and detects reflections of the emitted light beams. The device also includes an image sensor that detects external light originating from one or more external light sources. The image sensor comprises an array of adjacent rows of sensing elements. A given row of sensing elements in the array is arranged according to an arrangement of given light beams directed by the LIDAR sensor for a given pointing direction of the LIDAR sensor. The device also includes an actuator that rotates the LIDAR sensor about an axis to adjust the pointing direction of the LIDAR sensor. An arrangement of the plurality of light beams emitted by the LIDAR sensor is based on at least the adjustment of the pointing direction. The device also includes a controller that operates the image sensor to obtain a sequence of image pixels in a particular order that is based on at least the arrangement of the plurality of light beams emitted by the LIDAR sensor. The sequence of image pixels is indicative of measurements by respective sensing elements in the array according to respective exposure time periods of the respective sensing elements to the external light. The respective exposure time periods are based on at least the particular order.

In yet another example, a method involves rotating a light detection and ranging (LIDAR) sensor about an axis to scan an environment of the LIDAR sensor. The LIDAR sensor emits light pulses toward the environment and detects reflections of the emitted light pulses. The method also involves obtaining a sequence of image pixel rows using one or more cameras that detect external light originating from one or more external light sources. The one or more cameras together provide a plurality of rows of sensing elements. Each row of sensing elements is aligned with the axis of rotation of the LIDAR sensor. A first image pixel row in the sequence is indicative of a measurement of the external light by a first row of sensing elements during a first exposure time period. A second image pixel row in the sequence is indicative of a measurement of the external light by a second row of sensing elements during a second exposure time period.

In still another example, a system comprises means for rotating a light detection and ranging (LIDAR) sensor about an axis to scan an environment of the LIDAR sensor. The LIDAR sensor emits light pulses toward the environment and detects reflections of the emitted light pulses. The system also comprises means for obtaining a sequence of image pixel rows using one or more cameras that detect external light originating from one or more external light sources. The one or more cameras together provide a plurality of rows of sensing elements. Each row of sensing elements is aligned with the axis of rotation of the LIDAR sensor. A first image pixel row in the sequence is indicative of a measurement of the external light by a first row of sensing elements during a first exposure time period. A second image pixel row in the sequence is indicative of a measurement of the external light by a second row of sensing elements during a second exposure time period.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
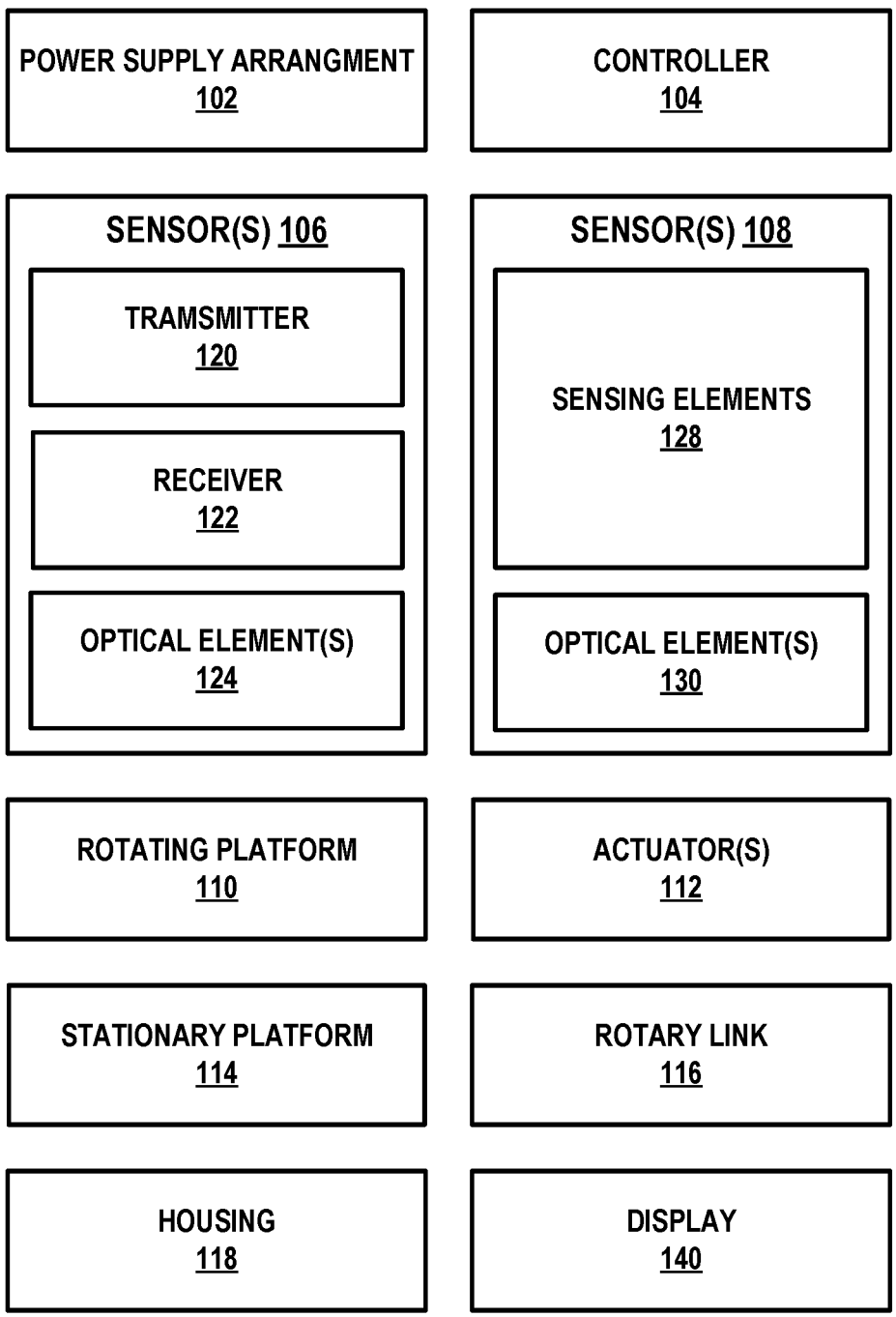
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. Overview

Sensor fusion algorithms can be employed to merge data from multiple sensors, such as an image sensor and a LIDAR sensor for instance, to generate a representation of a scanned environment. For instance, a 3D representation of a scanned environment may indicate color information determined using an image sensor combined with other information (e.g., distance, depth, intensity, texture, reflected light pulse length, etc.) determined using a LIDAR sensor.

Example devices, systems, and methods herein relate to spatial and/or temporal synchronization of two or more sensors that sense a surrounding environment. One example device may include a rotating LIDAR sensor and one or more cameras. The one or more cameras may together provide an array of adjacent rows of image sensing elements. The rows in the array can be aligned with (e.g., substantially parallel to) an axis of rotation of the LIDAR sensor. For instance, if the LIDAR sensor rotates about a vertical axis, then each row of sensing elements could be arranged as a vertical line of sensing elements parallel to the vertical axis of the LIDAR sensor.

With this arrangement for instance, the device can improve synchronization of the timing and viewing directions associated with: (i) image pixels captured by the one or more cameras and (ii) reflected light pulses detected by the LIDAR sensor.

By way of example, the LIDAR sensor may have an axis of rotation that is substantially vertical and may be configured to emit light pulses in a vertical pattern (e.g., parallel to the axis of rotation of the LIDAR sensor) repeatedly as the LIDAR sensor rotates. The light pulses emitted in the vertical pattern can be emitted very rapidly in comparison to the rate of rotation of the LIDAR sensor. Thus, in this example, the vertical direction may be described as a "fast axis" of the LIDAR sensor, and the horizontal direction of rotation of the LIDAR sensor may be described as a "slow axis" of the LIDAR sensor. The fast axis of the LIDAR sensor may correspond to a vertical direction in a data point cloud generated using the LIDAR sensor, and the slow axis of the LIDAR sensor may correspond to a horizontal direction in the data point cloud, for example.

A controller of the device can operate the one or more cameras to obtain a sequence of image pixels in an order similar to an order in which the LIDAR sensor emits (and detects) light pulses. For instance, a first line of image pixels in the sequence can be measured using a first row of sensing elements (e.g., vertical row) in the array, in a similar order (e.g., top to bottom, etc.) as the order in which the light pulses are emitted by the LIDAR sensor. A second line of image pixels in the sequence (subsequent to the first line) can then be measured using an adjacent vertical row of sensing elements in the array, and so on.

Each line of image pixels in the sequence may be measured according to a respective exposure time period of a respective row of sensing elements in the array. For example, the first line of image pixels may indicate an amount of external light incident on the first row of sensing element during a first exposure time period, and the second subsequent line of image pixels may indicate an amount of the external light incident on the second (adjacent) row of sensing elements during a second exposure time period (which begins after the first exposure time period begins). In some implementations, the second exposure time period may begin after the first exposure time period begins but before the first exposure time period ends. Alternatively, in other implementations, the second exposure time period may begin after the first exposure time period ends.

Through this process, a "fast axis" of the one or more cameras may correspond to the fast axis of the LIDAR sensor, and a "slow axis" of the one or more cameras may correspond to the slow axis of the LIDAR sensor. For example, when mounting the one or more cameras in the example device, the camera(s) could be physically rotated (e.g., from a horizontal orientation to a vertical orientation, etc.) relative to the LIDAR sensor until the rows of sensing elements that are measured one after another (i.e., fast axis of the camera(s)) are parallel to the axis of rotation of the LIDAR sensor (i.e., fast axis of the LIDAR sensor).

In some implementations, the controller of the device may operate the one or more cameras to obtain the sequence of image pixels according to a timing configuration provided by the controller. The timing configuration, for instance, may be based on an orientation of the LIDAR sensor (e.g., viewing direction, pointing direction, angular position, etc.) about the axis of rotation of the LIDAR sensor.

For example, the controller can obtain image pixels measured using a row of image sensing elements that image a field-of-view (FOV) near or (at least partially) overlapping a current FOV of the LIDAR sensor. For instance, the row of image sensing elements may be configured to detect external light from a particular region of the environment. To synchronize collection of the image pixels with collection of LIDAR data, the device can expose the row of sensing elements to the external light during an exposure time period that includes a time when the LIDAR sensor is also scanning the particular region of the environment (e.g., when the FOV of the rotating LIDAR overlaps the particular region of the environment). By doing so, for instance, the device can improve the likelihood of matching the sequence of image pixels with corresponding light pulse reflections detected by the LIDAR sensor during a similar time frame and from a similar viewing direction.

Through this process, sensor data from the LIDAR sensor and the camera(s) can be more effectively combined. More generally, example implementations herein may improve accuracy and/or efficiency of computer operations related to combining sensor data from two (or more) sensors by synchronizing, in the time domain and/or the space domain, sensor data collection operations of the two (or more) sensors.

II. Example Sensors

Although example sensors described herein include LIDAR sensors and cameras (or image sensors), other types of sensors are possible as well. A non-exhaustive list of example sensors that can be alternatively employed herein without departing from the scope of the present disclosure includes RADAR sensors, SONAR sensors, sound sensors (e.g., microphones, etc.), motion sensors, temperature sensors, pressure sensors, etc.

To that end, example sensors herein may include active sensors that emit a signal (e.g., a sequence of pulses or any other modulated signal) based on modulated power provided to the sensor, and then detects reflections of the emitted signal from objects in the surrounding environment. Alternatively or additionally, example sensors herein may include passive sensors (e.g., cameras, microphones, antennas, pressure sensors, etc.) that detect external signals (e.g., background signals, etc.) originating from external source(s) in the environment.

Referring now to the figures, FIG. 1 is a simplified block diagram of a system 100 that includes synchronized sensors, according to an example embodiment. As shown, system 100 includes a power supply arrangement 102, a controller 104, one or more sensors 106, one or more sensors 108, a rotating platform 110, one or more actuators 112, a stationary platform 114, a rotary link 116, a housing 118, and a display 140.

In other embodiments, system 100 may include more, fewer, or different components. Additionally, the components shown may be combined or divided in any number of ways. For example, sensor(s) 108 can be implemented as a single physical component (e.g., camera ring). Alternatively, for example, sensor(s) 108 can be implemented as an arrangement of separate physical components. Other examples are possible. Thus, the functional blocks of FIG. 1 are illustrated as shown only for convenience in description. Other example components, arrangements, and/or configurations are possible as well without departing from the scope of the present disclosure.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted, etc.) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 116. In another embodiment, one or more functions of controller 104 can be alternatively performed by one or more physically separate controllers that are each disposed within a respective component (e.g., sensor(s) 106, 108, etc.) of system 100.

In some examples, controller 104 may include or otherwise be coupled to wiring used for transfer of control signals to various components of system 100 and/or for transfer of data from various components of system 100 to controller 104. Generally, the data that controller 104 receives may include sensor data based on detections of light by LIDAR 106 and/or camera(s) 108, among other possibilities. Moreover, the control signals sent by controller 104 may operate various components of system 100, such as by controlling emission and/or detection of light or other signal by sensor(s) 106 (e.g., LIDAR, etc.), controlling image pixel capture rate or times via a camera (e.g., included in sensor(s) 108), and/or controlling actuator(s) 112 to rotate rotating platform 110, among other possibilities.

To that end, in some examples, controller 104 may include one or more processors, data storage, and program instructions (stored in the data storage) executable by the one or more processors to cause system 100 to perform the various operations described herein. In some instances, controller 104 may communicate with an external controller or the like (e.g., a computing system arranged in a vehicle, robot, or other mechanical device to which system 100 is mounted) so as to help facilitate transfer of control signals and/or data between the external controller and the various components of system 100.

Additionally or alternatively, in some examples, controller 104 may include circuitry wired to perform the various functions described herein. Additionally or alternatively, in some examples, controller 104 may include one or more special purpose processors, servos, or other types of controllers. For example, controller 104 may include a proportional-integral-derivative (PID) controller or other control loop feedback apparatus that operates actuator(s) 112 to modulate rotation of rotating platform 110 according to a particular frequency or phase. Other examples are possible as well.

Sensors 106 and 108 can optionally include one or more sensors, such as LIDARs, cameras, gyroscopes, accelerometers, encoders, microphones, RADARs, SONARs, thermometers, etc., that scan a surrounding environment of system 100.

Sensor(s) 106 may include any device configured to scan a surrounding environment by emitting a signal and detecting reflections of the emitted signal. For instance, sensor(s) 106 may include any type of active sensor. To that end, as shown, sensor 106 includes a transmitter 120 and a receiver 122. In some implementations, sensor 106 may also include one or more optical elements 124.

Transmitter 120 may be configured to transmit a signal toward an environment of system 100.

In a first example, where sensor 106 is configured as a LIDAR sensor, transmitter 120 may include one or more light sources (not shown) that emit one or more light beams and/or pulses having wavelengths within a wavelength range. The wavelength range could, for example, be in the ultraviolet, visible, and/or infrared portions of the electromagnetic spectrum depending on the configuration of the light sources. In some examples, the wavelength range can be a narrow wavelength range, such as provided by lasers and/or some light emitting diodes. In some examples, the light source(s) in transmitter 120 may include laser diodes, diode bars, light emitting diodes (LEDs), vertical cavity surface emitting lasers (VCSELs), organic light emitting diodes (OLEDs), polymer light emitting diodes (PLEDs), light emitting polymers (LEPs), liquid crystal displays (LCDs), microelectromechanical systems (MEMS), fiber lasers, and/or any other device configured to selectively transmit, reflect, and/or emit light to provide a plurality of emitted light beams and/or pulses.

In a second example, where sensor 106 is configured as an active infrared (IR) camera, transmitter 120 may be configured to emit IR radiation to illuminate a scene. To that end, transmitter 120 may include any type of device (e.g., light source, etc.) configured to provide the IR radiation.

In a third example, where sensor 106 is configured as a RADAR sensor, transmitter 120 may include one or more antennas configured to emit a modulated radio-frequency (RF) signal toward an environment of system 100.

In a fourth example, where sensor 106 is configured as a SONAR sensor, transmitter 120 may include one or more acoustic transducers, such as piezoelectric transducers, magnetostrictive transducers, electrostatic transducers, etc., configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

Receiver 122 may include one or more detectors configured to detect reflections of the signal emitted by transmitter 120.

In a first example, where sensor 106 is configured as a RADAR sensor, receiver 122 may include one or more antennas configured to detect reflections of the RF signal transmitted by transmitter 120. To that end, in some implementations, the one or more antennas of transmitter 120 and receiver 122 can be physically implemented as the same physical antenna structures.

In a second example, where sensor 106 is configured as a SONAR sensor, receiver 122 may include one or more sound sensors (e.g., microphones, etc.) that are configured to detect reflections of the sound signals emitted by transmitter 120.

In a third example, where sensor 106 is configured as an active IR camera, receiver 122 may include one or more light detectors (e.g., active pixel sensors, etc.) that are configured to detect a source wavelength of IR light transmitted by transmitter 120 and reflected off a scene toward receiver 122.

In a fourth example, where sensor 106 is configured as a LIDAR sensor, receiver 122 may include one or more light detectors (e.g., photodiodes, avalanche photodiodes, etc.) that are arranged to intercept and detect reflections of the light pulses emitted by transmitter 120 and reflected from one or more objects in a surrounding environment of system 100. To that end, receiver 122 may be configured to detect light having wavelengths in the same wavelength range as the light emitted by transmitter 120. In this way, for instance, sensor 106 (e.g., LIDAR) may distinguish reflected light pulses originated by transmitter 120 from other light originating from external light sources in the environment.

In some instances, receiver 122 may include a photodetector array, which may include one or more detectors each configured to convert detected light (e.g., in the wavelength range of light emitted by transmitter 120) into an electrical signal indicative of the detected light. In practice, such a photodetector array could be arranged in one of various ways. For instance, the detectors can be disposed on one or more substrates (e.g., printed circuit boards (PCBs), flexible PCBs, etc.) and arranged to detect incoming light. Also, such a photodetector array could include any feasible number of detectors aligned in any feasible manner. Additionally, the detectors in the array may take various forms. For example, the detectors may take the form of photodiodes, avalanche photodiodes (e.g., Geiger mode and/or linear mode avalanche photodiodes), silicon photomultipliers (SiPMs), phototransistors, cameras, active pixel sensors (APS), charge coupled devices (CCD), cryogenic detectors, and/or any other sensor of light configured to receive focused light having wavelengths in the wavelength range of the emitted light.

In some implementations, sensor 106 (e.g., in a LIDAR configuration) can select or adjust a horizontal scanning resolution by changing a rate of rotation of the LIDAR and/or adjusting a pulse rate of light pulses emitted by transmitter 120. As a specific example, transmitter 120 can be configured to emit light pulses at a pulse rate of 15,650 light pulses per second. In this example, LIDAR 106 may be configured to rotate at 10 Hz (i.e., ten complete 360° rotations per second). As such, receiver 122 can detect light with a 0.23° horizontal angular resolution. Further, the horizontal angular resolution of 0.23° can be adjusted by changing the rate of rotation of LIDAR 106 or by adjusting the pulse rate. For instance, if LIDAR 106 is instead rotated at 20 Hz, the horizontal angular resolution may become 0.46°. Alternatively, if transmitter 120 emits the light pulses at a rate of 31,300 light pulses per second while maintaining the rate of rotation of 10 Hz, then the horizontal angular resolution may become 0.115°. Other examples are possible as well. Further, in some examples, LIDAR 106 can be alternatively configured to scan a particular range of views within less than a complete 360° rotation of LIDAR 106.

Optical element(s) 124 can be optionally included in or otherwise coupled to transmitter 120 and/or receiver 122. In one example (e.g., where sensor 106 includes a LIDAR sensor), optical element(s) 124 can be arranged to direct light from a light source in transmitter 120 toward the environment. In another example, optical element(s) 124 can be arranged to focus and/or guide light from the environment toward receiver 122. As such, optical element(s) 124 may include any feasible combination of mirror(s), waveguide(s), light filters, lens(es), or any other optical components arranged to guide propagation of light through physical space and/or adjust certain light characteristics. For instance, optical elements 124 may include a light filter arranged to reduce or prevent light having wavelengths outside the wavelength range of the light emitted by transmitter 120 from propagating toward receiver 122. With such arrangement for instance, the light filter can reduce noise due to background light propagating from the scanned environment and originating from an external light source different than light sources of transmitter 120.

Sensor(s) 108 may include any type of sensor configured to scan the surrounding environment. As shown, sensors 108 include an array of sensing elements 128. Further, as shown, sensors 108 can optionally include one or more optical elements 130.

In some examples, sensor(s) 108 may include active sensors (e.g., LIDAR, RADAR, SONAR, etc.) that transmit signals and detect reflections thereof. Thus, although not shown, sensors 108 may include a transmitter and a receiver that are similar to, respectively, transmitter 120 and receiver 122. In other examples, sensor(s) 108 may include passive sensors (e.g., microphones, cameras, image sensors, thermometers, etc.) that detect external signals originating from one or more external sources.

In a first example, where sensor 108 is configured as a sound sensor, sensing elements 128 may include an array of microphones that each detect sounds (e.g., external signals) incident on the respective microphones in the array.

In a second example, where sensor(s) 108 are configured as one or more cameras, the camera(s) may include any camera (e.g., a still camera, a video camera, etc.) configured to capture images of the environment in which system 100 is located. For example, a camera of sensor 108 may include any imaging device that detects and provides data indicative of an image. For instance, sensing elements 128 may include one or more arrangements of light sensing elements that each provide a measure of light incident thereon. To that end, sensing elements 128 may include charge-coupled devices (CCDs), active pixel sensors, complementary metal-oxide-semiconductor (CMOS) photodetectors, N-type metal-oxide-semiconductor (NMOS) photodetectors, among other possibilities.

Further, in some examples, data from sensing elements 128 can be combined according to the arrangement of the sensing elements 128 to generate an image. In one example, data from a two-dimensional (2D) array of sensing elements may correspond to a 2D array of image pixels in the image. In another example, a 3D arrangement of sensing elements (e.g., sensing elements arranged along a curved surface) can be similarly used to generate a 2D array of image pixels in the image. Other examples are possible as well.

In some examples, a sensing element can optionally include multiple adjacent light detectors (or detectors of other types of signals), where each detector is configured to detect light (or other signal) having a particular wavelength or wavelength range. For instance, an image pixel may indicate color information (e.g., red-green-blue or RGB) based on a combination of data from a first detector that detects an intensity of red light, a second detector that detects an intensity of green light, and a third detector that detects an intensity of blue light. Other examples are possible as well.

In one embodiment, sensor(s) 108 may be configured to detect visible light propagating from the scene. Further, in this embodiment, receiver 122 of sensor 106 (e.g., LIDAR receiver) may be configured to detect invisible light (e.g., infrared, etc.) within a wavelength range of light emitted by transmitter 120. In this embodiment, system 100 (or controller 104) can then combine data from sensor 106 (e.g., LIDAR) with data from sensor 108 (e.g., camera) to generate a colored three-dimensional (3D) representation (e.g., point cloud) of the scanned environment.

In some examples, sensor(s) 108 may comprise a plurality of cameras (e.g., a camera ring) disposed in a circular arrangement around an axis of rotation of sensor 106 (e.g., LIDAR). For example, a first camera may be arranged to image a first field-of-view (FOV) of the environment that at least partially overlaps a range of pointing directions of sensor 106 as sensor 106 rotates about the axis (or as the signals transmitted by transmitter 120 are otherwise steered to different pointing directions about the axis). Further, a second camera adjacent to and/or overlapping the first camera may image a second FOV adjacent to the first FOV of the first camera, and so on. In this way, for instance, system 100 may be configured to capture a sequence of images of the respective FOVs simultaneously (and/or synchronously) with a scan of the environment by sensor 106 as sensor 106 rotates about the axis.

In some examples, sensor(s) 108 may be configured to operate in a rolling shutter mode.

In a first example, where sensor(s) 108 include a microphone array, each output from a microphone in the array may be associated with a respective exposure time period of a corresponding sensing element (e.g., microphone) to external sounds incident on sensor 108.

In a second example, where sensor(s) 108 include one or more cameras, each pixel or group of pixels output by the camera(s) may be associated with a respective exposure time period of a corresponding sensing element or group of sensing elements to external light. By way of example, camera(s) 108 may together provide an array of adjacent rows of sensing elements 128. Further, camera(s) 108 can be configured to output a sequence of image pixels that correspond to measurements of the external light by corresponding sensing elements in the array. For example, camera(s) 108 may output a first row of image pixels based on data from a first row of sensing elements in the array, followed by a second row of image pixels based on data from a second adjacent row of sensing elements in the array, and so on.

In this way, the first image pixel row may be associated with a first exposure time period during which the first row of sensing elements was exposed to light, the second image pixel row may be associated with a second exposure time period during which the second adjacent row of sensing elements was exposed to light, etc. The first exposure time period may begin before the second exposure time period begins. For instance, after a time delay from a start time of the first exposure time period (and optionally before the first exposure time period lapses), camera(s) 108 may start exposing the second adjacent row of sensing elements. Additionally, the first exposure time period may end before the second exposure time period ends. For instance, controller 104 may read outputs from the first row of sensing elements after the first exposure time period ends and while the second row of sensing elements is still being exposed to the external light, and then read outputs from the second row of sensing elements after the second exposure period ends and while a third row of sensing elements is still being exposed to the external light, and so on.

In some examples, where sensor 106 includes an image sensor, system 100 may be configured to select the order in which the sequence of image pixels are obtained from sensing elements 128 in the rolling shutter mode based on an order in which transmitter 120 is emitting light pulses (or other signals). For example, a given row of sensing elements in the array of sensing elements 128 may be aligned (e.g., parallel, etc.) with the axis of rotation of a LIDAR (e.g., sensor 106). For instance, if the axis of rotation of the LIDAR is a vertical axis, then the given row may correspond to a vertical row of sensing elements (e.g., vertical linear arrangement parallel to the axis of rotation of the LIDAR). Further, transmitter 120 may be configured to output a plurality of light beams in an arrangement of one or more vertical lines repeatedly as the LIDAR (e.g., sensor 106) rotates about the axis. As such, for example, sensor(s) 108 (e.g., camera(s)) may output a first row of image pixels using a first row of sensing elements that are arranged similarly (e.g., vertically, etc.) to the arrangement of the plurality of light beams emitted by transmitter 120. Next, camera(s) 108 may then output a second row of image pixels using a second adjacent row of sensing elements in the direction of the rotation of the LIDAR (or other sensor 106). Thus, for instance, the second row of image pixels may be aligned with a second vertical line of light beams emitted by transmitter 120 after sensor 106 rotates toward the second row of sensing elements, and so on.

By scanning vertical rows of sensing elements one after another, for instance, the sequence of image pixels obtained from camera(s) 108 may include a sufficient number of pixels that were captured at times (and from viewing directions) that are similar to the times and directions of LIDAR light pulses (or other signals) emitted by transmitter 120 (e.g., as transmitter 120 rotates about a vertical axis). Whereas, for instance, if the camera(s) (e.g., sensor(s) 108) instead captured the sequence of image pixels using a first horizontal row of sensing elements followed by a second horizontal row of sensing elements and so on, then fewer image pixels may be captured at times (and from viewing directions) that are similar to the times and directions of the LIDAR light pulses.

Optical element(s) 130 may include any combination of optical components such as lens(es), mirror(s), waveguide(s), light filter(s) or any other type of optical component similarly to optical element(s) 124. Further, optical elements 130 can be arranged to focus, direct, and/or adjust light characteristics of incident light for propagation toward sensing elements 128. Further, where sensor(s) 108 include a plurality of cameras for instance, optical element(s) 130 may include a plurality of respective camera lenses that focus external light onto respective image sensors of the cameras.

In some examples, optical element(s) 130 may include one or more light filters that selectively transmit particular wavelengths of light toward one or more particular sensing elements of sensor 106.

In a first example, optical element(s) 130 may include one or more light filters that attenuate light wavelengths of light emitted by transmitter 120. With this arrangement, for instance, system 100 can reduce noise measurements (by sensing element(s) 128) that are associated with the high intensity of light pulses (or other signals) emitted by transmitter 120.

In a second example, sensor 108 may include color image sensors (e.g., Bayer filter sensor, layered pixel sensor array, etc.) configured to indicate colors of incident light. In this example, optical element(s) 130 may include a color filter array, where each color filter of the array transmits red, green, or blue light to a particular sensing element adjacent to the color filter (and attenuates other wavelengths of light). System 100 can then generate (e.g., by combining outputs from multiple sensing elements that sense light having different colors) image pixels that indicate color information (e.g., red, green, and blue, etc.).

In a third example, optical element(s) 130 may include one or more filters that attenuate wavelengths of the light (or other signal) emitted by transmitter 120 and one or more other filters that allow transmission of these wavelengths. For instance, optical element(s) 130 may include a color filter array that includes green, red, and blue light filters. In this instance, a relatively large number of the color filters can be configured to attenuate the wavelengths of the emitted light of transmitter 120 to reduce the effects of the high intensity signals emitted by transmitter 120. Further, a relatively smaller number of the color filters (e.g., one or more of the green light filters, etc.) can be configured to (at least partially) allow transmission of wavelengths of the light (or other signal) emitted by transmitter 120. With this arrangement, the high intensity light of transmitter 120 (reflecting off objects in the environment of system 100) can be used to illuminate one or more sensing elements in dark external light conditions (e.g., night time).

Rotating platform 110 may be configured to rotate about an axis. For example, sensor 106 (and/or transmitter 120 and receiver 122 thereof) may be supported (directly or indirectly) by rotating platform 110 such that each of these components moves relative to the environment in response to rotation of rotating platform 110. In particular, each of these components could be rotated (simultaneously) relative to an axis so that sensor 106 may obtain information from various directions. In some examples, the axis of rotation of rotating platform 110 is vertical and a pointing direction of sensor 106 can be adjusted horizontally by the rotation of rotating platform 110 about its vertical axis of rotation. Rotating platform 110 can be formed from any solid material suitable for supporting one or more components (e.g., sensor 106) mounted thereon.

In order to rotate platform 110 in this manner, one or more actuators 112 may actuate rotating platform 110. To that end, actuators 112 may include motors, pneumatic actuators, hydraulic pistons, and/or piezoelectric actuators, among other possibilities.

With this arrangement, controller 104 could operate actuator 112 to rotate rotating platform 110 in various ways so as to obtain information about the environment. In one example, rotating platform 110 could be rotated in either direction. In another example, rotating platform 110 may carry out complete revolutions such that sensor 106 (e.g., LIDAR) provides a 360° horizontal FOV of the environment. Moreover, rotating platform 110 may rotate at various frequencies so as to cause sensor 106 to scan the environment at various refresh rates and/or scanning resolutions.

Alternatively or additionally, system 100 may be configured to adjust the pointing direction of the emitted signal (emitted by transmitter 120) in various ways. In some examples, signal sources (e.g., light sources, antennas, acoustic transducers, etc.) of transmitter 120 can be operated according to a phased array configuration or other type of beam steering configuration.

In a first example, where sensor 106 is configured as a LIDAR sensor, light sources in transmitter 120 can be coupled to phased array optics (e.g., optical elements 124) that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where sensor 106 is configured as a RADAR sensor, transmitter 120 may include an array of antennas, and controller 104 can provide respective phase-shifted control signals for each individual antenna in the array to modify a pointing direction of a combined RF signal from the array (e.g., phased array beam steering).

In a third example, where sensor 106 is configured as a SONAR sensor, transmitter 120 may include an array of acoustic transducers, and controller 104 can similarly operate the array of acoustic transducers (e.g., via phase-shifted control signals, etc.) to achieve a target pointing direction of a combined sound signal emitted by the array (e.g., even if the rotating platform 110 is not rotating, etc.).

In other examples, the pointing direction of sensor(s) 106 can be controlled using a deforming flexible structure (e.g., MEMs, etc.) that can be deformed in response to a control signal from controller 104 to adjust a steering direction of the signals emitted by transmitter 120. Other examples are possible.

Stationary platform 114 may take on any shape or form and may be configured for coupling to various structures, such as to a top of a vehicle for example. Also, the coupling of stationary platform 114 may be carried out via any feasible connector arrangement (e.g., bolts and/or screws). In this way, system 100 could be coupled to a structure so as to be used for various purposes, such as those described herein. In one example, sensor(s) 108 can be coupled to stationary platform 114. In this example, sensor(s) 108 can remain stationary relative to the rotational motion of sensor(s) 106 (or the otherwise changing beam directions of signals emitted by transmitter 120). In another example, sensor(s) 108 can be mounted to another physical structure different than stationary platform Rotary link 116 directly or indirectly couples stationary platform 114 to rotating platform 110. To that end, rotary link 116 may take on any shape, form and material that provides for rotation of rotating platform 110 about an axis relative to stationary platform 114. In some examples, rotary link 116 may take the form of a shaft or the like that rotates based on actuation from actuator 112, thereby transferring mechanical forces from actuator 112 to rotating platform 110. In one implementation, rotary link 116 may have a central cavity in which one or more components of system 100 may be disposed. In some examples, rotary link 116 may also provide a communication link for transferring data and/or instructions between stationary platform 114 and rotating platform 110 (and/or components thereon such as sensor(s) 106, etc.).

Housing 118 may take on any shape, form, and material and may be configured to house one or more components of system 100. In one example, housing 118 can be a dome-shaped housing. Further, in some examples, housing 118 may be composed of a material that is at least partially non-transparent, which may allow for blocking of at least some light from entering the interior space of housing 118 and thus help mitigate thermal and noise effects of ambient light on one or more components of system 100. Other configurations of housing 118 are possible as well. In some implementations, housing 118 may be coupled to rotating platform 110 such that housing 118 is configured to rotate about the above-mentioned axis based on rotation of rotating platform 110. In such implementations, sensor(s) 106 may rotate together with housing 118. In other implementations, housing 118 may remain stationary while sensor(s) 106 rotate within housing 118. System 100 could also include multiple housings similar to housing 118 for housing certain sub-systems or combinations of components of system 100. For example, system 100 may include a first housing for sensor(s) 106 and a separate housing for sensor(s) 108. Other examples are possible as well.

Display 140 can optionally be included in system 100 to display information about one or more components of system 100. For example, controller 104 may operate display 140 to display images captured using a camera (e.g., sensor 108), a representation (e.g., 3D point cloud, etc.) of an environment of system 100 indicated by LIDAR data from sensor 106, and/or a representation of the environment based on a combination of the data from sensors 106 and 108 (e.g., colored point cloud, images with superimposed temperature indicators, etc.). To that end, display 140 may include any type of display (e.g., liquid crystal display, LED display, cathode ray tube display, projector, etc.). Further, in some examples, display 140 may have a graphical user interface (GUI) for displaying and/or interacting with images captured by sensor 108, LIDAR data captured using sensor 106, and/or any other information about the various components of system 100 (e.g., power remaining via power supply arrangement 102). For example, a user can manipulate the GUI to adjust a scanning configuration of sensors 106 and/or 108 (e.g., scanning refresh rate, scanning resolution, etc.).

It is noted that the various components of system 100 can be combined or separated into a wide variety of different arrangements. For example, although sensors 106 and 108 are illustrated as separate components, one or more components of sensors 106 and 108 can alternatively be physically implemented within a single device. Thus, this arrangement of system 100 is described for exemplary purposes only and is not meant to be limiting.

Figure 2A:
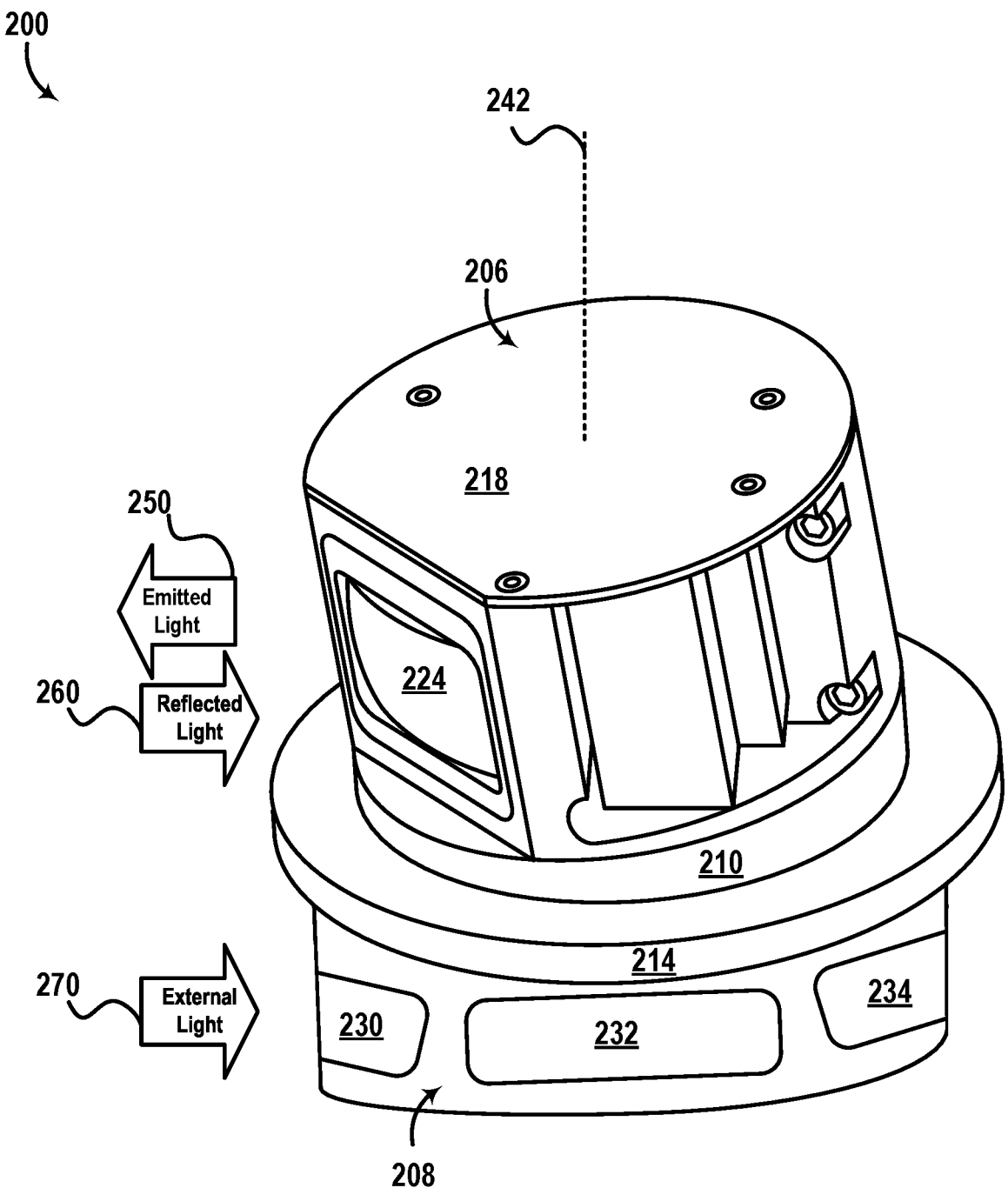
FIG. 2A illustrates a device that includes a rotating LIDAR sensor and a rolling shutter camera arrangement, according to example embodiments.

FIG. 2A illustrates a device 200 that includes a rotating LIDAR sensor 206 and a camera ring 208, according to example embodiments. As shown, device 200 includes a LIDAR 206, camera ring 208 (e.g., rolling shutter camera arrangement, etc.), a rotating platform 210, a stationary platform 214, a housing 218, a LIDAR lens 224, and camera lenses 230, 232, 234 which may be similar, respectively, to sensor(s) 106, sensor(s) 108, rotating platform 110, stationary platform 114, housing 118, optical element 124, and optical elements 130, for example.

As shown, light beams 250 emitted by LIDAR 206 propagate from lens 224 along a pointing direction of LIDAR 206 toward an environment of LIDAR 206, and reflect off one or more objects (not shown) in the environment as reflected light 260. Further, as shown, LIDAR 206 may then receive reflected light 290 (e.g., through lens 224). Thus, for instance, LIDAR 206 may provide data (e.g., data point cloud, etc.) indicating distances between the one or more objects and the LIDAR 206 based on detection(s) of the reflected light 290, similarly to the discussion above for sensor 106.

Further, as shown, each camera of camera ring 208 may receive and detect a respective portion of external light 270 incident on the respective camera. To that end, external light 270 may include light originating from one or more external light sources, such as the sun, a street lamp, among other possibilities. For example, external light 270 may include light propagating directly from an external light source toward camera lenses 230, 232, and/or 234. Alternatively or additionally, external light 270 may include light originating from an external light source and reflecting off one or more objects (not shown) in the environment of device 200 before propagating toward lenses 230, 232, and/or 234. Thus, for example, the cameras of camera ring 208 may generate one or more images of the environment based on external light 270. Further, each image generated by a particular camera may correspond to a particular FOV of the particular camera relative to device 200.

To that end, in some examples, camera ring 208 may include a plurality of cameras that are arranged in a ring formation (e.g., circular arrangement, oval arrangement, etc.) relative to one another. Each camera of the plurality can be positioned (e.g., mounted to device 200 and/or camera ring 208) at a particular angle and/or orientation. Thus, for instance, a FOV of a first camera may be adjacent to and/or partially overlapping FOVs of two other adjacent cameras. With this arrangement for instance, images from the individual cameras can be combined into an image of a 360-degree FOV of device 200. Further, during assembly or calibration of device 200 for instance, the respective angle and/or orientation of each camera can be adjusted to reduce or prevent blind spots (e.g., regions of the surrounding environment that are not within FOVs of all the cameras in camera ring 208). For example, the respective FOVs of two adjacent cameras can be aligned (e.g., by moving, rotating, and/or otherwise adjusting relative mounting positions of the two cameras, etc.) such that a region of the environment between the FOVs of the two cameras (e.g., "blind spot") is less than a threshold distance from device 200.

To facilitate this, in one implementation, camera ring 208 could optionally include a housing (e.g., ring-shaped, etc.) having one or more indentations that receive and/or support the cameras at particular respective mounting positions (e.g., angle, orientation, etc.). In another implementation, an example system (e.g., system 100, a calibration system, etc.) may be configured to compare images captured by the cameras, and to determine, based on the comparison, alignment offsets that achieve respective target FOVs for the respective cameras. The example system may also include and/or operate a robotic arm, an actuator, and/or any other alignment apparatus to adjust the positions of the cameras in camera ring 208 according the determined alignment offsets. Other examples are possible.

In some examples, device 200 (or another computing device coupled thereto) may operate the cameras of camera ring 208 and/or process the captured images therefrom (e.g., combine portions of the captured images, etc.) to form a cohesive circular vision of the environment of device 200. For example, a computing system (not shown) of device 200 or another device may match features in images captured by camera ring 208 to generate a combined image that spans a combination of the FOVs of the cameras.

In one implementation, lens 230 may focus light from a first 90-degree FOV of device 200, lens 232 may focus light from a second adjacent 90-degree FOV, and so on. The first FOV could optionally partially overlap the first FOV. In other implementations, the FOV imaged by each camera may be more or less than 90 degrees. Further, in line with the discussion above, an image captured by any of the cameras in camera ring 208 may indicate various types of information such as light intensities for different wavelengths (e.g., colors, etc.) in external light 270, among other examples.

In some examples, LIDAR 206 (and/or housing 218) can be configured to have a substantially cylindrical shape and to rotate about axis 242, based on rotation of rotating platform 210 that supports LIDAR 206 for instance. Further, in some examples, the axis of rotation 242 may be substantially vertical. Thus, for instance, by rotating LIDAR 206 about axis 242, device 200 (and/or a computing system that operates device 200) can determine a three-dimensional map based on data from LIDAR 206) of a 360-degree view of the environment of device 200. Additionally or alternatively, in some examples, device 200 can be configured to tilt the axis of rotation of rotating platform 210 (relative to stationary platform 214), thereby adjusting the FOV of LIDAR 206. For instance, rotating platform 210 may include a tilting platform that tilts in one or more directions.

In some examples, as shown, LIDAR lens 224 can have an optical power to both collimate (and/or direct) emitted light beams 250 toward an environment of LIDAR 206, and focus reflected light 260 received from the environment onto a LIDAR receiver (not shown) of LIDAR 206. In one example, lens 224 has a focal length of approximately 120 mm. Other example focal lengths are possible. By using the same lens 224 to perform both of these functions, instead of a transmit lens for collimating and a receive lens for focusing, advantages with respect to size, cost, and/or complexity can be provided. Alternatively however, LIDAR 206 may include separate transmit and receive lenses. Thus, although not shown, LIDAR 206 can alternatively include a transmit lens that directs emitted light 250 toward the environment, and a separate receive lens that focuses reflected light 260 for detection by a receiver of LIDAR 206.

It is noted that device 200 may include more, fewer, or different components than those shown, and one or more of the components shown may be combined or separated in different ways. In one example, instead of multiple camera lenses 230, 232, 234, device 200 could alternatively include a single camera lens that extends around a circumference of camera ring 208. In another example, although camera ring 208 is shown to be coupled to stationary platform 214, camera ring 208 can alternatively be implemented as a separate physical structure. In yet another example, camera ring 208 can be positioned above LIDAR 206, without being rotated by rotating platform 214. In still another example, camera ring 208 may include more or fewer cameras than shown. Other examples are possible.

Figure 2B:
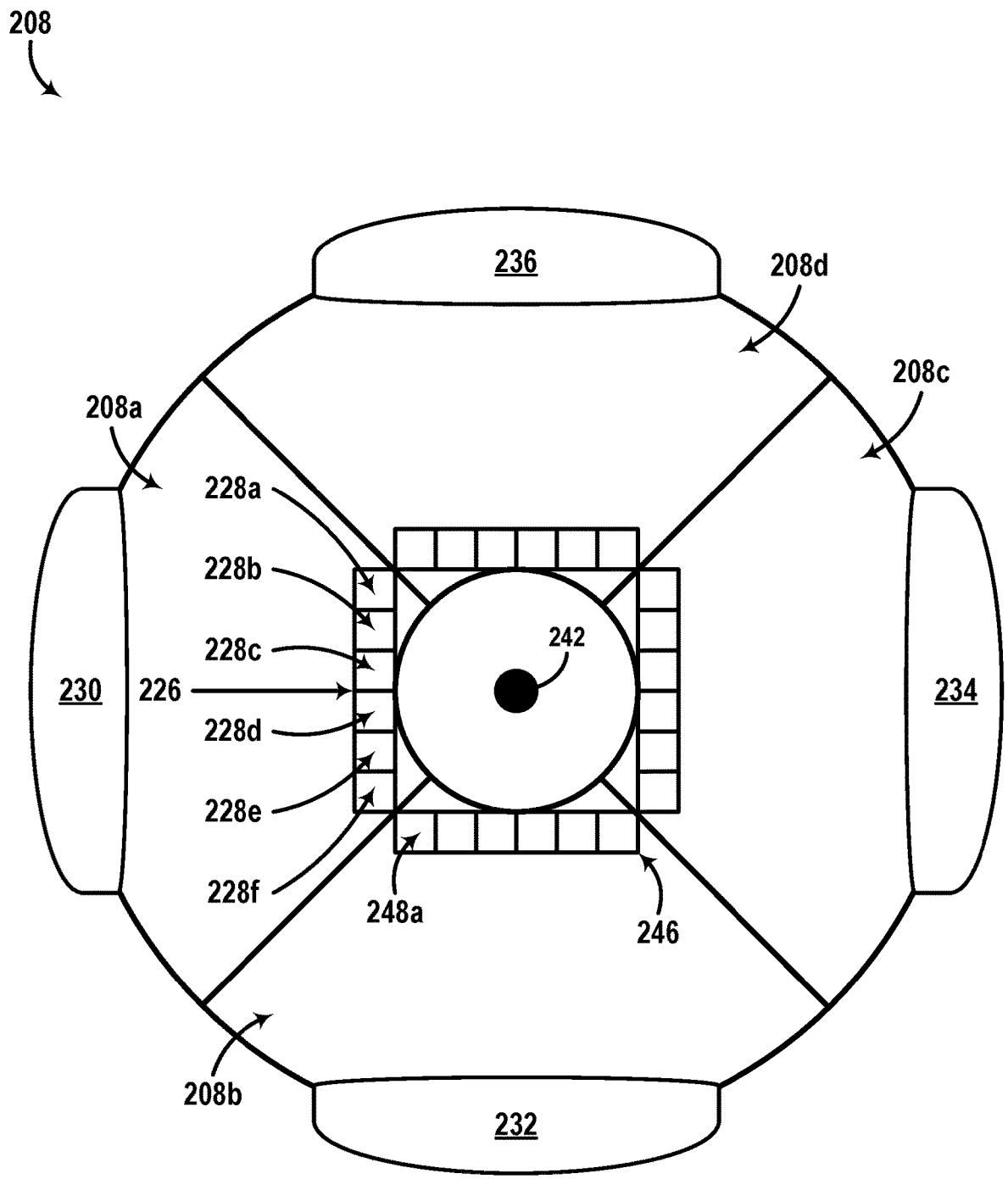
FIG. 2B is a cross-section view of the rolling shutter camera arrangement of FIG. 2A.

FIG. 2B illustrates a cross-section view of camera ring 208, according to an example embodiment. In the cross-section view of FIG. 2B, axis 242 (i.e., axis of rotation of LIDAR 206) extends through the page. As shown, camera ring 208 includes four cameras 208a, 208b, 208c, 208d that are arranged around axis of rotation 242. Thus, in the example shown, each of the cameras may be configured to image a respective 90-degree FOV of the environment of device 200. However, in other embodiments, camera ring 208 may include fewer or more cameras than shown. In one particular embodiment, camera ring 208 may alternatively include eight cameras, where each camera is coupled to a respective lens that focuses light from (at least) a respective 45-degree FOV of the environment onto an image sensor of the camera. Other examples are possible. Thus, camera ring 208 may have a wide variety of different configurations and thus the configuration shown includes four cameras only for convenience in description.

Further, as shown, camera 208a includes lens 230 that focuses a first portion of external light (e.g., light 270) from the environment of device 200 onto an image sensor 226 of camera 208a. Further, as shown, camera 208b includes lens 232 that focuses a second portion of the external light onto an image sensor 246 of camera 232. Similarly, cameras 208c and 208d may be configured to focus respective portions of the external light onto respective image sensors of the cameras.

Further, as shown, each image sensor may include an array of sensing elements similar to sensing elements 128 for example. For instance, image sensor 226 of camera 208a may include an array of adjacent rows of sensing elements, exemplified by sensing elements 228a-228f (which may be similar to sensing elements 128 for example). By way of example, a first row of sensing elements in image sensor 226 may include sensing element 228a and one or more other sensing elements (not shown) that are vertically arranged through the page (e.g., parallel to axis 242). Further, a second row of sensing elements adjacent to the first row may include sensing element 228b and one or more other sensing elements (not shown) that are vertically arranged through the page, and so on.

In this way, for example, cameras 208a, 208b, 208c, 208d may together provide an array of adjacent rows of sensing elements that are arranged around axis 242, so as to be able to image various corresponding portions of a 360-degree (horizontal) FOV around device 200. For instance, a given row of sensing elements in image sensor 246 of camera 204b may include sensing element 248a (and one or more other sensors arranged parallel to axis 242 through the page). Further, in this instance, the given row of sensing elements in camera 208b may also be adjacent to a row of sensing elements in camera 208a that includes sensing element 228f. Thus, in an example scenario, the sequence of image pixels obtained from camera ring 208 may include a row of image pixels obtained using data from the row of sensing elements that includes sensing element 228f, followed by a row of image pixels obtained using data from the row of sensing elements that includes sensing element 248a.

It is noted that the number of rows of sensing elements in each of the image sensors (e.g., sensors 226, 246, etc.) is illustrated as shown only for convenience in description. However, in some embodiments, image sensor 226 (and/or 246) may include more or fewer rows of sensing elements than shown. In one particular embodiment, image sensor 226 may alternatively include 3000 rows of sensing elements, and each row may include 1000 sensing elements (extending through the page). In this embodiment, camera 208a may thus be configured to output a 3000×1000 pixel image. Further, in this embodiment, camera 208a may be configured to capture images at a rate of 60 Hz. Other camera configuration parameters are possible as well.

It is noted that the sizes, shapes, and positions of the various components of device 200 are not necessarily to scale, but are illustrated as shown only for convenience in description. In one example, the sizes of the lenses 230, 232, 234, 236, and sensors 226, 246, etc., shown in FIG. 2B may be different than the sizes shown. In another example, the distance between lens 230 and image sensor 226 may be different than the distance shown. In one embodiment, the distance from lens 230 to sensor 226 may correspond to approximately twice the diameter of lens 230. However, in other embodiments, image sensor 226 and camera lens 230 may have other sizes, shapes, and/or positions relative to one another.

Figure 2C:
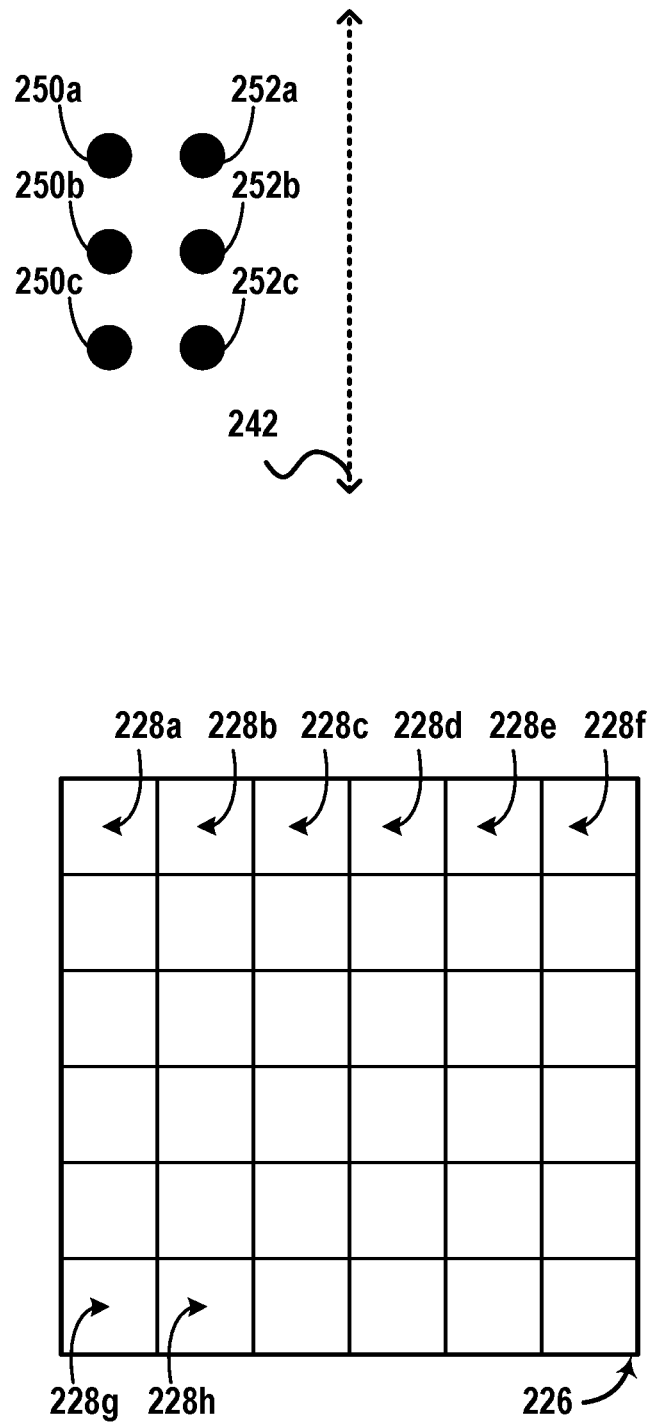
FIG. 2C is a conceptual illustration of an operation of the device of FIG. 2A.

FIG. 2C is a conceptual illustration of an operation of device 200, according to an example embodiment. In the illustration of FIG. 2C, the sensing elements of image sensor 226 of camera 208a are in the plane of the page. It is noted that some of the components of device 200, such as camera lens 230 and LIDAR 206 for instance, are omitted from the illustration of FIG. 2C for convenience in description.

In some implementations, device 200 may be configured to operate cameras 208a, 208b, 208c, and/or 208d in a rolling shutter configuration to obtain a sequence of image pixels. In the scenario of FIG. 2C for example, a first row of sensing elements that includes sensing elements 228a and 228g may be configured to measure an amount of external light incident thereon during a first exposure time period. Device 200 may also include an analog to digital converter (not shown) that reads and converts the measurements by the first row of sensing elements (after the first exposure time period lapses) for transmission to a controller (e.g., controller 104) of device 200. After a time delay from a start time of the first exposure time period (and optionally before the first exposure time period ends), device 200 may start exposing a second row of sensing elements that includes sensing elements 228b and 228h for a second exposure time period. Thus, in some examples, exposure time periods of multiple rows of sensing elements may partially overlap (e.g., the time delay between the start times of the first and second exposure time periods may be less than the first exposure time period, etc.). In this way, a camera in the rolling shutter configuration can stagger the start times of the exposure time periods to increase the image refresh rate (e.g., by simultaneously exposing multiple rows of sensing elements during the overlapping portions of their respective exposure time periods).

Continuing with the scenario, after the second exposure time period lapses, device 200 may then similarly measure and transmit the measurements by the second row of sensing elements to the controller. This process can then be repeated until all the rows of sensing elements (i.e., a complete image frame) are scanned. For example, after a start time of the second exposure time period (and optionally before the second exposure time period lapses), device 200 may begin exposing a third row of sensing elements (adjacent to the second row) to external light 270, and so on.

Further, as noted above, device 200 may be configured to obtain the sequence of image pixels in an order that is similar to the order in which light pulses are emitted by LIDAR 206. By doing so, for instance, more image pixels captured by cameras 208a-d may overlap (in both time and viewing direction) with LIDAR data (e.g., detected reflections of the emitted light pulses) than in an implementation where the sequence of image pixels is obtained in a different order.

Continuing with the scenario of FIG. 2C for example, light beams 250a, 250b, 250c may correspond to the emitted light 250 shown in FIG. 2A when LIDAR 206 is at a first pointing direction or orientation about axis 242. In the scenario, the device 200 may be configured to scan the first (vertical) row of sensing elements (e.g., including elements 228a and 228g) before scanning sensing elements in the second (vertical) row (e.g., including elements 228b and 228h). By doing so, the image pixels captured using the first row of sensing elements may be more likely to be matched with detected reflections of light beams 250a-250c in terms of both time and viewing direction. In the scenario, LIDAR 206 may then rotate (e.g., counterclockwise) about axis 242 and emit light beams 252a-252c. Device 200 may then obtain a second row of image pixels using the second row of sensing elements (e.g., including sensing elements 228b and 228h), which may be more likely to be aligned (in both time and viewing direction) with detected reflections of light beams 252a-252c, and so on.

On the other hand, if device 200 instead obtained the sequence of image pixels in the order of a row that includes sensing elements 228a-228f (e.g., a horizontal row), followed by an adjacent (horizontal) row of sensing elements, etc., then the sequence of image pixels would be less likely to match the detected reflections of light beams 250a-250c and 252a-252c. By way of example, if image sensor 226 is operated at 60 Hz refresh rate (i.e., 60 images per second) using the horizontal (row by row) scanning order, then an image pixel associated with sensing element 228g in the obtained sequence may have a time delay of approximately 16 milliseconds compared to the emission time of light beam 250c. Other example refresh rates and/or time delays are possible.

In some implementations, device 200 may also be configured to obtain a row of image pixels in the sequence according to the order of emission of the light pulses/beams by LIDAR 206. As a variation of the scenario above for example, if LIDAR 206 emits light beams 250a, 250b, 250c in that order, then device 200 may be configured to obtain the image pixel row associated with the first row of sensing elements in a similar order (e.g., beginning with sensing element 228a and ending with sensing element 228g). Whereas, for instance, if LIDAR 206 emits light beams 250c, 250b, 250a in that order, then device 200 may instead be configured to obtain the image pixel row in an opposite order (e.g., beginning with sensing element 228g and ending with sensing element 228a).

Further, in some implementations, device 200 may be configured to adjust a time delay between capturing subsequent image pixel rows in the sequence of image pixels based on a rate of rotation of LIDAR 206. For example, if LIDAR 206 increases its rate of rotation (e.g., via actuator(s) 112, etc.), then device 200 may reduce the time delay between obtaining the first row of image pixels associated with the first row of sensing elements (e.g., including sensing elements 228a and 228g) and obtaining the second row of image pixels associated with the second adjacent row of sensing elements. As noted above, for instance, the exposure start times associated with each row of sensing elements may depend on the order and time of obtaining the corresponding image pixels, and thus adjusting the time delay may improve the extent of matching image pixel capture times (and viewing directions) with corresponding LIDAR pulse emission times (and/or detections of corresponding reflections).

Figure 2D:
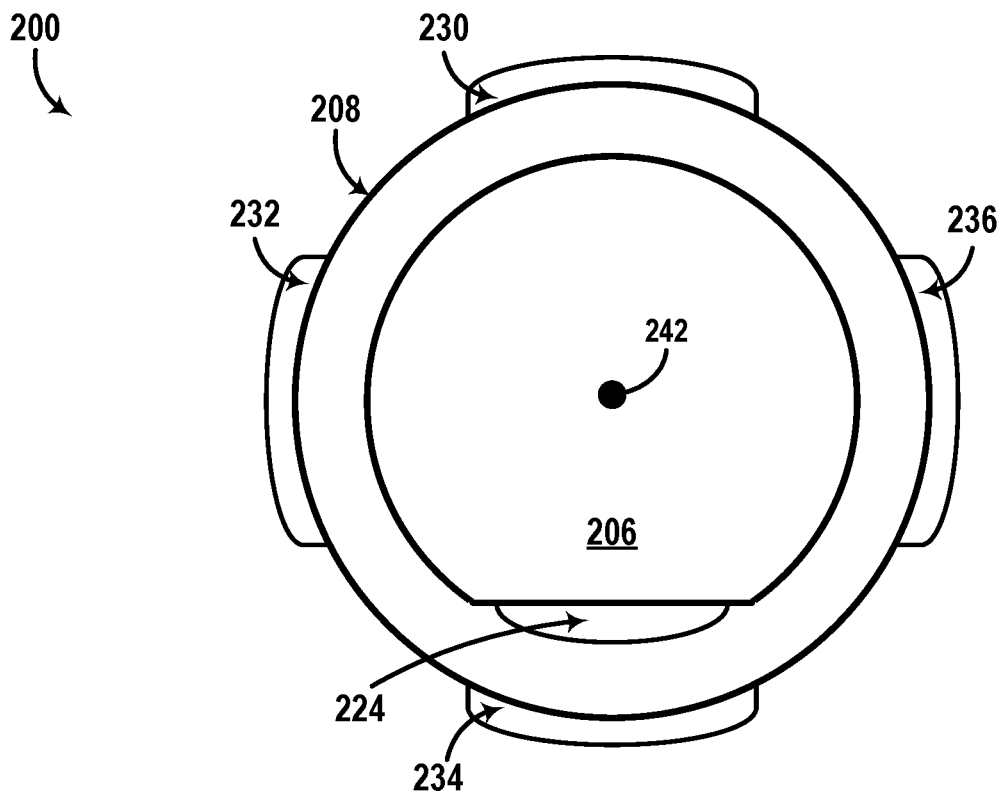
FIG. 2D illustrates a top view of the device of FIG. 2A.

FIG. 2D illustrates a top view of device 200. In the illustration of FIG. 2D, LIDAR 206 may have a first pointing direction that corresponds to an angular position of 0° about axis 242 (e.g., toward the bottom of the page). In this configuration for example, LIDAR 206 may scan a region of the surrounding environment that corresponds to a center of an image captured using camera 208c (best shown in FIG. 2B), which includes lens 234.

Figure 2E:
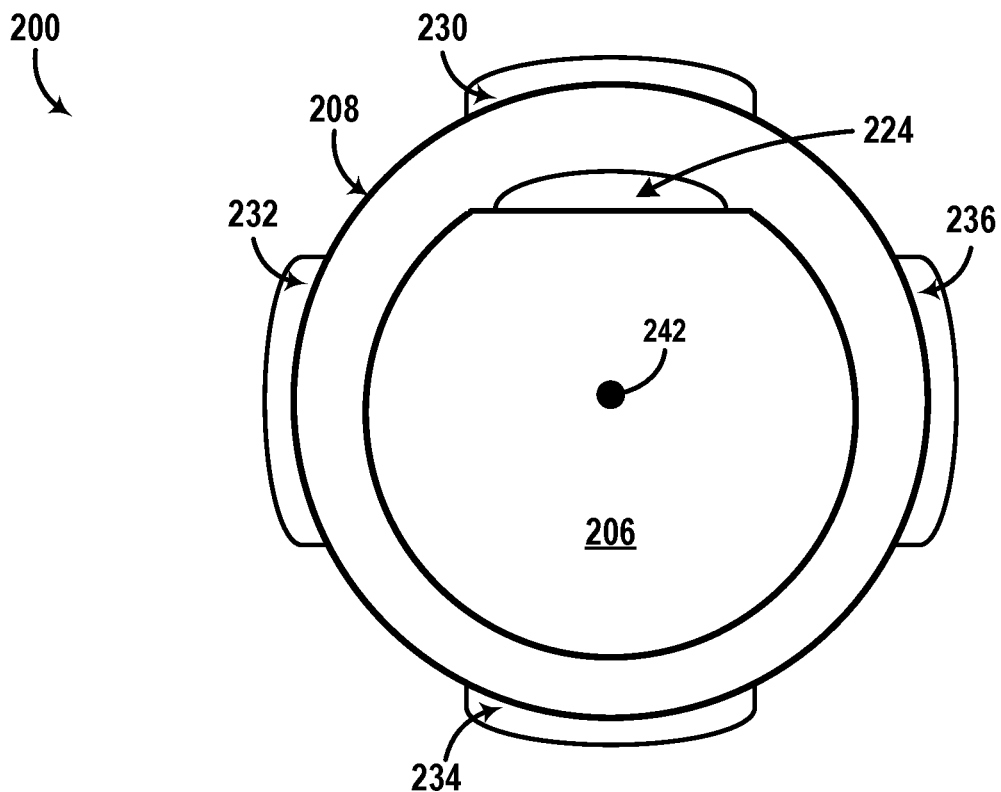
FIG. 2E illustrates another top view of the device of FIG. 2A.

FIG. 2E illustrates another top view of device 200. In the illustration of FIG. 2E, LIDAR 206 may have a second pointing direction that corresponds to an angular position of 180° about axis 242 (e.g., toward the top of the page). For instance, LIDAR 206 may have the second pointing direction of FIG. 2E after LIDAR 206 is rotated from the first pointing direction of FIG. 2D by half a complete rotation about axis 242. Further, in this configuration for example, LIDAR 206 may scan a region of the environment that corresponds to a center of an image captured using camera 208a (best shown in FIG. 2B), which includes lens 230.

In some scenarios, as LIDAR 206 rotates about axis 242, the time period in which FOVs of LIDAR 206 overlap the FOV of camera 208a may be less than the exposure time period (and readout time period) suitable for capturing an image using camera 208a.

In one example scenario, where camera 208a is operated in a rolling shutter configuration (e.g., rows of sensing elements in camera 208a exposed according to different exposure start times), image sensor 226 of camera 208a may measure and output an image frame (i.e., pixel data from all the sensing elements of image sensor 226) over a period of 60 ms. Further, in the scenario, LIDAR 206 may be configured to rotate at a rotation rate of 10 Hz (i.e., one complete rotation about axis 242 every 100 ms). Thus, LIDAR 206 may scan a range of FOVs that overlap an FOV of camera 208a within a time period of 100 ms/4=25 ms (e.g., from t=37.5 ms to t=62.5 ms). To account for the difference between the scanning durations of the camera and the LIDAR, in some implementations, device 200 may be configured to synchronize LIDAR light pulses emitted by LIDAR 206 with image pixels captured by some but not all the image sensing elements in a camera.

For example, device 200 can be configured to trigger capturing an image by a particular camera such that a particular region of the image (e.g., vertical row(s) of image pixels at or near the center of the image, etc.) is exposed to external light when LIDAR 206 is pointing at a particular pointing direction aligned with the particular region of the image.

Continuing with the scenario above for instance (where LIDAR 206 rotates at a frequency of 10 Hz), at time t=0 ms, LIDAR 206 (as shown in FIG. 2D) may have a first pointing direction (e.g., angular position about axis 242=0°). Further, at time t=50 ms, LIDAR 206 (as shown in FIG. 2E) may have a second pointing direction (e.g., angular position about axis 242=180°).

In this scenario, device 200 may be configured to synchronize a center of the exposure time period of image sensor 226 (inside camera 208a) with the time (e.g., t=50 ms) at which the FOV of LIDAR 206 overlaps the center of the FOV of camera 208a. For example, where the exposure time period of image sensor 226 is 60 ms, then at time t=30 ms the center vertical rows of sensing elements in image sensor 226 may be exposed to external light. In this example, camera 208a may trigger an image capture at time t=50−30=20 ms to align (in both the time domain and space domain) exposure of vertical row(s) of sensing elements near the center of image sensor 226 with the LIDAR light pulses emitted when LIDAR 206 is scanning a FOV that corresponds to the center of the image (e.g., at t=50 ms).

With this arrangement, image pixels near the center of the image (e.g., captured using the vertical row including sensing element 228c, or the row including sensing element 228d) may be relatively more aligned (with respect to timing and viewing direction) with LIDAR light pulses that were emitted/detected when these image pixels were measured. On the other hand, image pixels captured using rows of sensing elements that are further from the center of the image sensor may be relatively misaligned (in time or viewing direction) with LIDAR light pulses that were emitted/detected when these image pixels were measured. By way of example, the FOVs of the rotating LIDAR may overlap the camera FOV of camera 208a between times t=37.5 ms and t=62.5 ms. In the scenario above however, camera 208a may begin exposing the row of sensing elements that include sensing element 228a (best shown in FIG. 2C) at time t=20 ms (i.e., outside the range of times when the FOV of the LIDAR overlaps the FOV of the camera).

To mitigate this misalignment, in some examples, cameras 208a, 208b, 208c, 208d can be configured to have partially overlapping FOVs. For example, camera 208d (best shown in FIG. 2B) may be configured to have a FOV that partially overlaps the FOV of adjacent camera 208a. Further, the exposure time period associated with a center region of an image captured using camera 208d can be synchronized with the time (e.g., t=25 ms) at which LIDAR 206 is pointing toward a FOV associated with the center of the image captured using camera 208d. Thus, in these examples, device 200 (or other computer) can use the aligned image pixel data from camera 208d (e.g., image pixels near center of captured image) instead of the misaligned image pixel data captured using camera 208a (e.g., image pixels further from the center of the image) for mapping with the LIDAR data.

Figure 3:
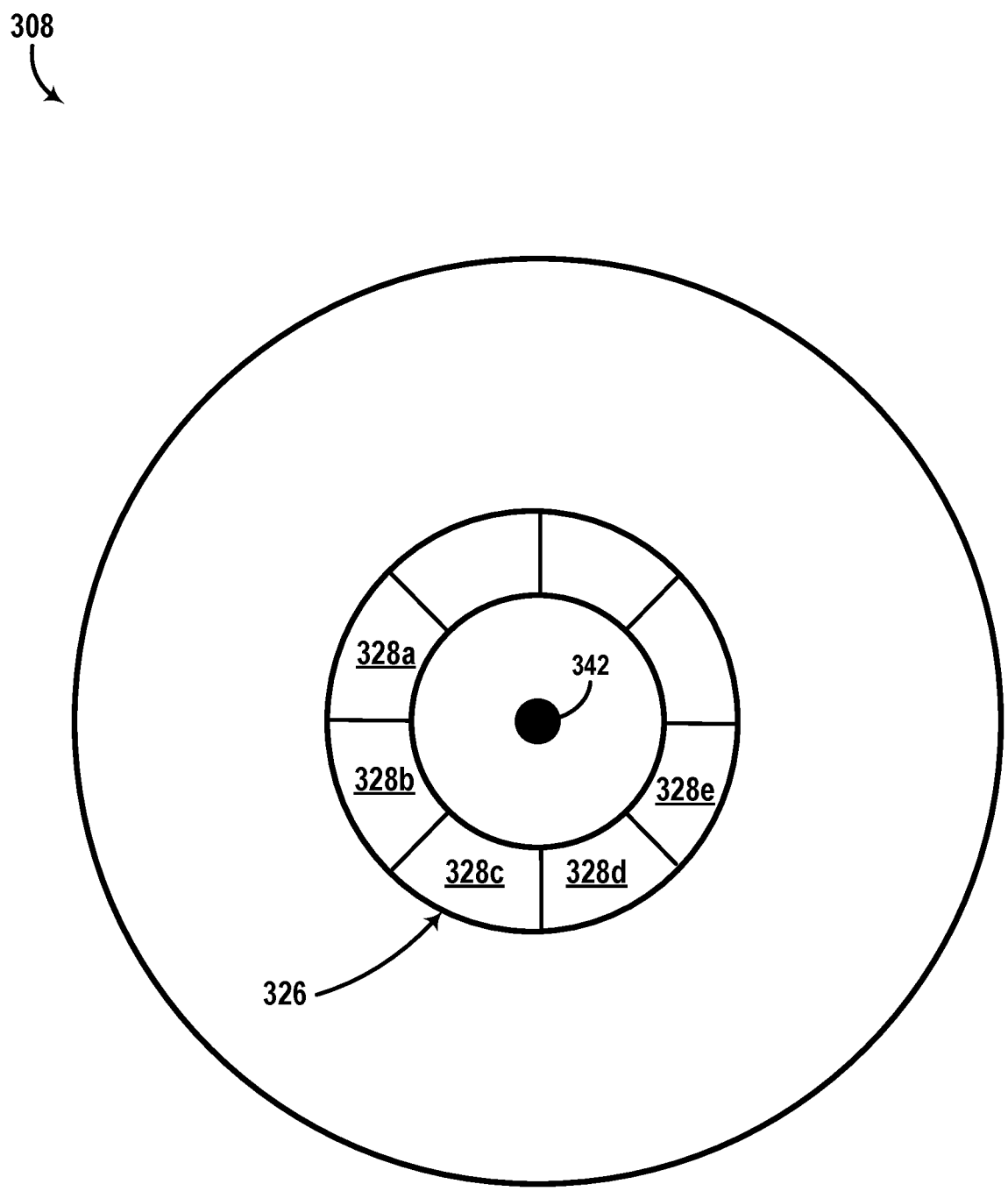
FIG. 3 illustrates a cross-section view of another rolling shutter camera arrangement, according to example embodiments.

FIG. 3 illustrates a cross-section view of another rolling shutter camera arrangement 308 (e.g., camera ring), according to example embodiments. Camera ring 308 may be similar to camera ring 208 shown in FIG. 2B. As shown, for example, axis 342 may be an axis of rotation of a LIDAR similarly to axis 242. Further, for example, image sensor 326 may be similar to image sensor 226 (and/or 246) and may include an array of sensing elements, exemplified by sensing elements 328a-328e, which may be similar to sensing elements 228a-228f. For example, image sensor 326 may comprise a first row of sensing elements that includes sensing element 328a and one or more other sensing elements (not shown) in a linear arrangement (e.g., perpendicular to the page), and a second adjacent row of sensing elements that includes sensing element 328b and one or more other sensing elements (not shown) in a linear arrangement (e.g., perpendicular to the page).

Although not shown, camera ring 308 may also include one or more camera lenses (e.g., similar to camera lenses 230, 232, 234, 236, etc.) that focus portions of external light incident on camera ring 308 toward respective sensing elements in the image sensor 326. Additionally or alternatively, camera ring 308 may include one or more of the components shown in any of system 100 and/or device 200.

As shown, camera ring 308 includes image sensor 326 that is disposed along a curved surface (e.g., circular surface) around axis 342. In one example, image sensor 326 can be implemented on a flexible substrate (e.g., flexible PCB, etc.) that mounts an arrangement of sensing elements (including sensing elements 328a-328e, etc.). Thus, with this arrangement, each of the rows of sensing elements in image sensor 326 may be at a same given distance to the axis of rotation 342 (e.g., circular or cylindrical arrangement of sensing elements). In another example, image sensor 326 can be implemented as a plurality of physically separate rows of sensing elements that are arranged adjacent to one another around axis of rotation 342. For instance, each physically separate row of sensing elements may be located at a same given distance to the axis of rotation as the other rows. Other examples are possible. Regardless of the implementation, in the configuration of camera ring 308, the curved surface on which each row of sensing elements in image sensor 326 is mounted may improve the overlap (e.g., in terms of viewing direction) between the image pixels captured by the sensing elements and the light beams emitted by a LIDAR sensor that rotates about axis 342.

For instance, as the LIDAR sensor rotates about axis 342, the viewpoint of the LIDAR device (e.g., location of LIDAR lens) may move in a circular path. Thus, with this arrangement, the curved surface of image sensor 326 may resemble the circular path of emitted/detected LIDAR light pulses to improve the likelihood of matching image pixels collected by sensor 326 with LIDAR light pulses (that are detected along a similar curved path in the horizontal direction of the rotation of the LIDAR sensor).

III. Example Methods and Computer Readable Media

Figure 4:
FIG. 4 is a flowchart of a method, according to example embodiments.

FIG. 4 is a flowchart of a method 400, according to example embodiments. Method 400 presents an embodiment of a method that could be used with any of system 100, device 200, and/or camera ring 308, for example. Method 400 may include one or more operations, functions, or actions as illustrated by one or more of blocks 402-404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 400 and other processes and methods disclosed herein, each block in FIG. 4 may represent circuitry that is wired to perform the specific logical functions in the process.

At block 402, method 400 involves rotating a LIDAR sensor about an axis to scan an environment of the LIDAR sensor. For example, LIDAR sensor 206 may be mounted on rotating platform 210 that rotates about axis 242 to adjust a pointing direction of LIDAR sensor 206. Further, while rotating, LIDAR sensor 206 may emit one or more light beams or pulses 250 toward a field-of-view of the environment defined by the pointing direction of LIDAR 206, and then detect reflections (e.g., reflections 260) of the emitted light 250. Further, an example system may process the detected reflections (e.g., via controller 104) to determine information (e.g., distance, texture, material, etc.) about one or more objects in the environment of LIDAR sensor 206.

In some examples, an arrangement of the one or more light beams directed by the LIDAR sensor toward the environment may be based on rotation characteristics of the LIDAR sensor. Referring back to FIG. 2C for example, the LIDAR sensor may emit light beams 250a, 250b, 250c when the LIDAR sensor is at a first pointing direction about axis 242, and light beams 252a, 252b, 252c when the LIDAR sensor is at a second pointing direction about axis 242. If the rotation characteristics of the LIDAR sensor are modified, then the arrangement of light beams 250a, 250b, 250c, 252a, 252b, 252c may responsively change. For example, if the LIDAR sensor is rotated at a faster rate, then a distance between light beams 250a, 250b, 250c and light beams 252a, 252b, 252c may increase. As another example, if the LIDAR sensor is rotated in an opposite direction, then the directions of light beams 252a, 252b, 252c relative to the directions of light beams 250a, 250b, 250c may be different than shown in FIG. 2C. Other examples are possible.

At block 404, method 400 involves obtaining, while rotating the LIDAR sensor, a sequence of image pixels using one or more cameras that detect external light originating from one or more external light sources. For example, the one or more cameras may together provide a plurality of adjacent rows of sensing elements, similarly to the arrangement of sensing elements in cameras 208a, 208b, 208c, 208d (shown in FIG. 2B). Further, one or more of the rows of sensing elements may be arranged according to a direction of the axis of rotation of the LIDAR sensor. Referring back to FIG. 2C for example, a first row of sensing elements including elements 228a and 228g may be in a vertical arrangement similar to a vertical direction of axis 242, and a second row of sensing elements including element 228b and 228h may also be in a vertical arrangement similar to the vertical direction of axis 242, and so on.

Further, in some examples, a first image pixel row in the sequence may indicate a measurement of external light by the first row of sensing elements during a first exposure time period, and a second image pixel row in the sequence may indicate a measurement of the external light by a second row of sensing elements during a second exposure time period. For example, the one or more cameras could be operated in a rolling shutter configuration where image sensing elements (or rows) are sequentially measured (e.g., read out) to obtain the sequence of image pixels. Further, in line with the discussion above, the first exposure time period of the first row of sensing elements may begin before the second exposure time period of the second (subsequent) row of sensing elements begins.

For instance, a start time of the first exposure time period may be prior to a start time the second exposure time period. In this instance, a first line or row of image pixels in the sequence (obtained at block 404) may be based on data from the first row of sensing elements (exposed during the first exposure time period), and a second subsequent line or row of image pixels in the sequence may be based on data from the second row of sensing element (exposed during the second exposure time period).

With this arrangement, for instance, the first row of sensing elements may begin imaging a first region of the environment within a first FOV of the first row before the second row begins imaging a second (e.g., horizontally adjacent) region of the environment. Further, the LIDAR sensor can be rotated about the axis in a rotation direction that causes the LIDAR sensor to scan the first FOV imaged by the first row of sensing elements prior to scanning the second FOV imaged by the second row of sensing elements.

Accordingly, in some implementations, obtaining the sequence of image pixels (or image pixel rows) may comprise determining a timing configuration for operating the one or more cameras based on at least one or more rotation characteristics of the LIDAR sensor (and/or an arrangement of light beams directed by the LIDAR sensor toward the environment). In these implementations, method 400 may also involve operating the one or more cameras to obtain the sequence of image pixels at block 404 according to the determined timing configuration.

Referring back to FIG. 2C for example, device 200 may choose the order of the image pixels in the sequence for a particular row of sensing elements based on the order in which corresponding light beams were emitted by the LIDAR sensor. For instance, where LIDAR 206 emits light beams 250c, 250b, 250a (in that order), then device 200 may obtain a first row of image pixels in the sequence beginning with a pixel associated with sensing element 228g and ending with a pixel associated with sensing element 228a. Whereas, if LIDAR 206 emits light beams 250a, 250b, 250c (in that order), then device 200 may obtain the first row of image pixels in the sequence beginning with a pixel associated with sensing element 228a and ending with a pixel associated with sensing element 228g. Accordingly, in some implementations, method 400 may involve operating an image sensor (e.g., of the one or more cameras) to obtain a sequence of image pixels that are measured in a particular order based on the arrangement (and/or order of emission) of the plurality of light beams emitted by the LIDAR sensor.

As another example, device 200 may select which row of sensing elements in sensor 226 to read for image pixels depending on the orientation or pointing direction of LIDAR 206. For example, device 200 may trigger exposure of image sensor 226 (shown in FIG. 2B) such that the center of the exposure time period of image sensor 226 is synchronized with the time at which the FOV of LIDAR 206 overlaps the center of the image (e.g., the time at which LIDAR 206 is at the orientation shown in FIG. 2E).

Accordingly, in some implementations, method 400 involves obtaining the sequence of image pixels based on at least the angular direction (e.g., pointing direction, viewing direction, etc.) of the LIDAR sensor. Further, in some implementations, method 400 may involve determining a start time of a camera exposure time period of a particular camera of the one or more cameras based on a time associated with the LIDAR sensor being in a particular orientation about the axis of rotation. In some examples, the particular orientation may define a particular FOV of the LIDAR sensor that at least partially overlaps a region of the environment represented in a portion of the image captured using the particular camera (e.g., center region of the camera, etc.).

Referring back to FIG. 2B for example, camera 208a may focus external light from a FOV of camera 208a toward image sensor 226. Further, camera 208a may be operated in a rolling shutter mode where the camera begins exposing a first row of sensing elements that includes element 228a, then begins exposing a second row that includes element 228b after a time delay, and so on. The camera exposure time period of camera 208a may include respective exposure time periods of all the rows of sensing elements in image sensor 226. Further, in this example, a system of method 400 may trigger capturing an image by camera 208a such that a center of the camera exposure time period corresponds to a given time when LIDAR 206 is pointing toward a center of the FOV of camera 208a (e.g., the given time when LIDAR 206 is at the orientation shown in FIG. 2E).

In some implementations, method 400 involves determining a start time for the first exposure period (of the first row of sensing elements) based on one or more emission times of one or more light pulses (or beams) emitted by the LIDAR sensor, and operating the one or more cameras based on the determined start time, in line with the discussion above (e.g., select the appropriate row depending on the emission times of light beams 250a-250c and/or 252a-252c and the pointing direction of the LIDAR sensor when emitting the respective light beams).

In some implementations, method 400 involves determining an order of respective exposure start times of adjacent rows of sensing elements to the external light based on at least a direction of the rotation of the LIDAR sensor, and operating the one or more cameras based on the determined order. Referring back to FIG. 2C for example, after obtaining the image pixel row associated with elements 228b and 228h, device 200 may next obtain an image pixel row associated with sensing elements 228a and 228g if LIDAR 206 is rotating in a clockwise direction. On the other hand, if LIDAR 207 is rotating in a counterclockwise direction, then device 200 may instead obtain an image pixel row associated with the row of sensing elements that includes element 228c.

In some implementations, method 400 involves determining a time delay based on a rate of rotation of the LIDAR sensor, obtaining the first image pixel row using the first row of sensing elements, and obtaining the second image pixel row using the second row of sensing elements after passage of the determined time delay from obtaining the first image pixel row. Referring back to FIG. 2C for example, device 200 may increase the time delay between obtaining the first image pixel row (including elements 228a and 228g) and the second image pixel row (including elements 228b and 228h)

if the rate of rotation of LIDAR 206 decreases, or may decrease the time delay if the rate of rotation of LIDAR device 206 increases.

As a variation of the example above, device 200 may begin the first exposure time period of the first row of sensing elements (including elements 228*a* and 228*g*) at a first start time, and then begin the second exposure time period of the second row of sensing elements (including elements 228*b* and 228*h*) at a second start time (i.e., after passage of the determined time delay). Thus, in some implementations, method 400 involves determining a time delay between a start time of the first exposure time period and a start time of the second exposure time period based on rotation characteristics of the LIDAR sensor (e.g., rate of rotation, etc.), and operating the one or more cameras according to the determined time delay.

In some implementations, method 400 involves controlling respective camera exposure time periods of the one or more cameras based on the pointing direction (and/or rotation characteristics) of the LIDAR sensor. In other implementations, method 400 involves modifying one or more rotation characteristics of the LIDAR sensor based on the respective camera exposure time periods of the one or more cameras. Referring back to FIG. 2B for example, cameras 208*a*, 208*b*, 208*c*, 208*d* can be operated to capture images using their respective image sensors in a particular rolling shutter configuration that defines the order of image pixels in the sequence of image pixels obtained at block 404. In this example, a system of method 400 can operate the LIDAR sensor to emit light beams in an order and arrangement that matches the order and arrangement of the image pixels measured by the cameras.

Referring back to FIG. 2C for example, the system of method 400 can control the order of emitted light beams 250*a*, 250*b*, 250*c* to match the order in which a first row of sensing elements including elements 228*a* and 228*g* are measured (e.g., top to bottom, or bottom to top). As another example, the system can adjust the frequency of rotation of LIDAR 206 according to the time delay between measurement of image pixels associated with the first row and measurement of image pixels associated with a second row that includes sensing elements 228*b* and 228*h*. As yet another example, the system may adjust the direction of the rotation of LIDAR 206 to match the direction of the "slow axis" of camera 208*a*. Other examples are possible.

In some implementations, method 400 involves associating data from the LIDAR sensor with one or more image pixels in the sequence of image pixels (or image pixel rows) based on at least the timing configuration. For example, an example system may keep track of times in which individual image pixels were captured as well as the times in which reflected LIDAR pulses are detected. Further, the example system may then map image pixels that were captured with a threshold period of time to a corresponding LIDAR pulse detection.

Alternatively or additionally, in some implementations, method 400 involves associating data from the LIDAR sensor with one or more image pixels in the sequence of image pixels based on at least pointing directions of the LIDAR sensor and viewing directions of the sensing elements in the array. Referring back to FIG. 2C for example, data based on LIDAR 206 detecting reflections of light pulses 250*a*, 250*b*, 250*c* when LIDAR 206 is in a first pointing direction can be matched with image pixels collected using one or more of the image sensing elements in the row that includes sensing elements 228*a* and 228*g* (e.g., which correspond to image sensing elements that have a same or similar viewing direction as the LIDAR pointing direction at which light pulses 250*a*, 250*b*, 250*c* were emitted). Accordingly, in some implementations, method 400 involves associating a given image pixel row in the sequence with given data collected by the LIDAR sensor based on at least a comparison of a field-of-view (FOV) of a first row of sensing elements to a FOV of the LIDAR sensor when the given data was collected by the LIDAR sensor.

In some implementations, method 400 involves determining a three-dimensional (3D) representation of the environment based on data from the LIDAR sensor and the sequence of image pixels (or image pixel rows). For example, an example system may combine LIDAR-based information (e.g., distances to one or more objects in the environment, etc.) with camera-based information (e.g., color, etc.) to generate the 3D representation. Other types of representations (e.g., 2D image, image with tags, enhanced image that indicates shading or texture information, etc.) based on a combination of LIDAR and image data are possible. Thus, in some implementations, method 400 involves determining a representation of the environment based on color information indicated by the sequence of image pixels (or image pixel rows) and information (e.g., distance, depth, texture, reflectivity, absorbance, reflective light pulse length, etc.) indicated by the LIDAR sensor.

In a first example, a system of method 400 may determine depth information for image pixels in the sequence based on data from the LIDAR sensor. For instance, the system can assign a depth value for image pixels in an image. Additionally, for instance, the system can generate (e.g., via display 140) a 3D object data model (e.g., a 3D rendering) of one or more objects in the environment (e.g., colored 3D model that indicates 3D features in the environment, etc.). In another instance, an image processing system can identify and distinguish between multiple objects in the image by comparing depth information (indicated by the associated LIDAR data) of the respective objects. Other applications are possible. Thus, in some implementations method 400 involves mapping LIDAR data points collected using the LIDAR sensor to image pixels collected using the one or more cameras. For instance, the LIDAR data can be mapped to a coordinate system of an image output by an image sensor or camera.

In a second example, a system of method 400 may assign colors (based on data from the one or more cameras) to individual points in a LIDAR point cloud. The example system can then generate (e.g., via display 140) a 3D rendering of the scanned environment that indicate distances to features in the environment along with color (e.g., colored point cloud, etc.) information indicated by the image sensor(s) of the one or more cameras. Thus, in some implementations, method 400 involves mapping image pixels from the sequence to corresponding LIDAR data points obtained using the LIDAR sensor. For instance, the image pixel data can be mapped to a coordinate system of the LIDAR data output by the LIDAR sensor.

In a third example, a system of method 400 may identify and assign particular LIDAR data point(s) and particular image pixel(s) to particular location(s) in another space (e.g., 3D space, etc.). For instance, the system can display and update (e.g., via display 140) a representation of the environment using data from the LIDAR sensor, the one or more cameras, and/or other sensors (e.g., RADARs, SONARs, etc.) accessible to the system. Accordingly, in some implementations, method 400 involves mapping image pixels from the sequence and LIDAR data points from the LIDAR sensor to a given 3D space. Thus, for instance, the LIDAR data and image pixel data can be mapped to a coordinate system other than the coordinate systems defined by LIDAR and the camera(s).

In some implementations, method 400 involves mounting the one or more cameras in a ring arrangement. Referring back to FIG. 2B for example, cameras 208*a*, 208*b*, 208*c*, 208*d* may be mounted in a ring or circular arrangement (e.g., around axis 242) to image respective portions of the environment of camera ring 208.

In a first implementation, mounting the one or more cameras may be based on one or more characteristics of a given camera of the one or more in the ring arrangement. For example, the given camera can be individually tested to ensure that an extent of a given FOV imaged by the given camera is within a threshold range from a target FOV (e.g., 90 degrees, 45 degrees, etc.). To facilitate this, for instance, an example system may compare images obtained by the given camera with a stored image of the target FOV, etc. Thus, in some examples, method 400 may also involve adjusting the one or more cameras based on the determined one or more characteristics.

In a second implementation, mounting the one or more cameras may be based on one or more characteristics associated with the relative mounting positions of the one or more cameras in the ring arrangement. In one example, a system of method 400 may determine a distance (from a device that includes the cameras) at which FOVs imaged by two adjacent cameras intersect or overlap. Objects in the environment within the determined distance may be undetected (e.g., "blind spot") by the system using the adjacent cameras. Further, for instance, the determination of the distance may be based on images captured using the cameras, sensor data captured by other sensors (e.g., LIDAR data, etc.) that image the same region of the environment, etc. In another example, the system may be configured to determine the relative rotational orientations of the one or more cameras. For example, respective offsets in roll, pitch, etc., directions of the cameras can be determined (e.g., based on images captured by the cameras, etc.) and/or compared to one another. Thus, in some examples, method 400 may also involve adjusting the relative mounting positions of the one or more cameras based on the determined one or more characteristics.

In a third implementation, mounting the one or more cameras may involve determining one or more characteristics associated with one or more other sensors that scan the environment imaged by the one or more cameras in the ring arrangement. For example, the system may compare the FOVs of the one or more cameras with a FOV of the LIDAR, a FOV of a RADAR, or a FOV of any other sensor in the system. Further, in some instances, the system may mount the one or more cameras in the ring arrangement at particular mounting positions to achieve a target overlap between the FOVs of the one or more cameras and the FOVs of the one or more sensors. Thus, in some examples, method 400 may also involve adjusting the mounting positions of the one or more cameras based on the determined one or more characteristics associated with the one or more sensors.

In a fourth implementation, mounting the one or more cameras may involve determining whether images captured using the one or more cameras in the ring arrangement are indicative of one or more objects in the environment. For example, the system may determine if the FOVs of the camera(s) are suitable for detecting objects in particular positions relative to the system (e.g., traffic lights under various lighting conditions, pedestrians, construction cones, etc.). Further, in some examples, method 400 may also involve adjusting the mounting positions or other characteristic (e.g., exposure time, image brightness, etc.) of the one or more cameras based on the determination of whether the captured images are indicative of the one or more objects.

IV. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A system comprising:
a light detection and ranging (LIDAR) sensor, wherein the LIDAR sensor is configured to perform a scan of an environment based on adjustment of a pointing direction of the LIDAR sensor about an axis, and wherein the adjustment of the pointing direction adjusts a field-of-view (FOV) of the LIDAR sensor;
a camera configured to capture images within a FOV of the camera; and
a controller coupled to the LIDAR sensor and the camera, wherein the controller is configured to determine a start time of an exposure time period of the camera based on a particular time associated with the pointing direction of the LIDAR sensor being in a particular orientation about the axis and cause the camera to capture an image during the exposure time period, such that the exposure time period includes a time when the FOV of the LIDAR sensor at least partially overlaps the FOV of the camera.

2. The system of claim 1, wherein the controller is configured to cause the camera to capture the image such that a center of the exposure time period occurs when the FOV of the LIDAR sensor overlaps a center of the FOV of the camera.

3. The system of claim 1, wherein the camera operates in a rolling shutter mode.

4. The system of claim 1, wherein the camera comprises a plurality of rows of sensing elements, wherein each row of the plurality of rows is aligned with the axis.

5. The system of claim 1, wherein the camera is a first camera, further comprising:
a second camera configured to capture images within a FOV of the second camera.

6. The system of claim 5, wherein the controller is further configured to cause the second camera to capture a second image during a second exposure time period, such that the second exposure time period includes a time when the FOV of the LIDAR sensor at least partially overlaps the FOV of the second camera.

7. The system of claim 5, wherein the adjustment of the pointing direction about the axis causes the FOV of the LIDAR sensor to sequentially overlap the FOV of the first camera and the FOV of the second camera during the scan.

8. The system of claim 5, wherein the FOV of the first camera partially overlaps the FOV of the second camera.

9. The system of claim 1, wherein the axis is a vertical axis.

10. The system of claim 1, wherein the LIDAR sensor and the camera are coupled to a vehicle.

11. A method comprising:

determining an exposure time period for a camera to capture an image while a light detection and ranging (LIDAR) sensor is performing a scan of an environment, wherein performing the scan comprises adjusting a pointing direction of the LIDAR sensor about an axis, wherein adjusting the pointing direction adjusts a field-of-view (FOV) of the LIDAR sensor, and wherein determining the exposure time period comprises determining a start time of the exposure time period based on a particular time associated with the pointing direction of the LIDAR sensor being in a particular orientation about the axis such that the exposure time period includes a time when the FOV of the LIDAR sensor at least partially overlaps a FOV of the camera; and causing the camera to capture the image during the exposure time period.

12. The method of claim 11, wherein a center of the exposure time period occurs when the FOV of the LIDAR sensor overlaps a center of the FOV of the camera.

13. The method of claim 11, wherein the camera operates in a rolling shutter mode.

14. The method of claim 11, wherein the camera comprises a plurality of rows of sensing elements, wherein each row of the plurality of rows is aligned with the axis.

15. The method of claim 11, wherein the camera is a first camera, further comprising:

causing a second camera to capture a second image during a second exposure time period, wherein the second exposure time period includes a time when the FOV of the LIDAR sensor at least partially overlaps a FOV of the second camera.

16. A non-transitory computer readable medium storing instructions executable by a processor to perform functions comprising:

determining an exposure time period for a camera to capture an image while a light detection and ranging (LIDAR) sensor is performing a scan of an environment, wherein performing the scan comprises adjusting a pointing direction of the LIDAR sensor about an axis, wherein adjusting the pointing direction adjusts a field-of-view (FOV) of the LIDAR sensor, and wherein determining the exposure time period comprises determining a start time of the exposure time period based on a particular time associated with the pointing direction of the LIDAR sensor being in a particular orientation about the axis such that the exposure time period includes a time when the FOV of the LIDAR sensor at least partially overlaps a FOV of the camera; and causing the camera to capture the image during the exposure time period.

17. The non-transitory computer readable medium of claim 16, wherein a center of the exposure time period occurs when the FOV of the LIDAR sensor overlaps a center of the FOV of the camera.

18. The non-transitory computer readable medium of claim 16, wherein the camera operates in a rolling shutter mode.

19. The non-transitory computer readable medium of claim 16, wherein the camera comprises a plurality of rows of sensing elements, wherein each row of the plurality of rows is aligned with the axis.

20. The non-transitory computer readable medium of claim 16, wherein the camera is a first camera, and wherein the functions further comprise:

causing a second camera to capture a second image during a second exposure time period, wherein the second exposure time period includes a time when the FOV of the LIDAR sensor at least partially overlaps a FOV of the second camera.

\* \* \* \* \*